United States Patent
Singh

(10) Patent No.: US 12,367,436 B2
(45) Date of Patent: Jul. 22, 2025

(54) SYSTEM INCLUDING AUTOMATED CONTENT ANALYSIS OF INBOUND EMAIL CONTENT FOR CREATING AN ISSUE OBJECT FOR AN ISSUE TRACKING SYSTEM

(71) Applicants: Atlassian Pty Ltd., Sydney (AU); Atlassian US, Inc., San Francisco, CA (US)

(72) Inventor: Rahul Singh, Delhi (IN)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 72 days.

(21) Appl. No.: 18/090,896

(22) Filed: Dec. 29, 2022

(65) Prior Publication Data
US 2024/0220877 A1   Jul. 4, 2024

(51) Int. Cl.
| | |
|---|---|
| G06F 16/3329 | (2025.01) |
| G06F 3/0482 | (2013.01) |
| G06Q 10/0631 | (2023.01) |
| G06Q 10/107 | (2023.01) |
| G06F 11/07 | (2006.01) |
| H04L 41/16 | (2022.01) |
| H04L 67/63 | (2022.01) |

(52) U.S. Cl.
CPC ..... G06Q 10/06311 (2013.01); G06F 3/0482 (2013.01); G06F 16/3329 (2019.01); G06Q 10/107 (2013.01); G06F 11/0769 (2013.01); H04L 41/16 (2013.01); H04L 67/63 (2022.05)

(58) Field of Classification Search
CPC ..... H04L 41/16; H04L 41/5074; H04L 67/63; G06F 16/3329; G06F 11/0769; G06F 16/35; G06F 16/5846
See application file for complete search history.

(56) References Cited

U.S. PATENT DOCUMENTS

| | | | |
|---|---|---|---|
| 2017/0052940 A1* | 2/2017 | Allen | G06F 40/30 |
| 2018/0130069 A1* | 5/2018 | Chaitanya | G06F 40/205 |
| 2019/0087746 A1* | 3/2019 | Jain | G06N 20/20 |
| 2019/0361760 A1* | 11/2019 | Krishnan | G06F 11/076 |
| 2022/0156462 A1* | 5/2022 | McNamara | G06F 40/211 |

* cited by examiner

*Primary Examiner* — Tom Y Chang
(74) *Attorney, Agent, or Firm* — Brownstein Hyatt Farber Schreck, LLP

(57) ABSTRACT

A computer-implemented method for handling inbound service requests analyzes content of the message to extract a set of features, and generating a feature vector based on the set of extracted features. A categorization metric for the feature vector is then determined, using a set of predetermined categorization vectors, wherein each predetermined categorization vector corresponds to a respective portal endpoint associated with one or more predefined ticket types and sub-types of an information technology service management system. In response to the categorization metric satisfying a comparison criteria with respect to one or more predetermined categorization vectors, a particular portal endpoint is selected. Content from the email message is then extracted. A new issue object request is then automatically generated in accordance with a particular object requirement set associated with the particular portal endpoint for submission to an issue tracking system to create a new issue object.

16 Claims, 14 Drawing Sheets

350

352 — WELCOME TO THE IT SERVICE DESK!
Need IT help? Solve it yourself in the IT Knowledge Base or chat with us.

HELP CENTER / IT SERVICE DESK

IT IT SERVICE DESK

Get IT help including access to applications, hardware support and software enhancements.
Select the closest match for your request from the options below:

CONTACT US ABOUT

[ ACCOUNTS, ACCESS & SOFTWARE REQUESTS ▼ ]

*WHAT CAN WE HELP YOU WITH?*

353 — [ SOFTWARE AND/OR LICENSE REQUEST ]

354 — [ SUBMIT AN ACCESS REQUEST ]

355 — [ REQUEST A BOT ACCOUNT ]

356 — [ REPORT A SECURITY ISSUE ]

357 — [ CHART OF ACCOUNTS, DEPARTMENT, PRODUCT CODE, PROJECT CODE & SUBSIDIARY CHANGES ]

*FIG. 3B*

WELCOME TO THE IT SERVICE DESK!
Need IT help? Solve it yourself in the IT Knowledge Base or chat with us.

HELP CENTER / IT SERVICE DESK

[IT] IT SERVICE DESK

Get IT help including access to applications, hardware support and software enhancements.
Select the closest match for your request from the options below:

CONTACT US ABOUT

ACCOUNTS, ACCESS & SOFTWARE REQUESTS ⌄

*WHAT CAN WE HELP YOU WITH?*

SOFTWARE AND/OR LICENSE REQUEST

1) Which software do you need?

2) What is your computer's OS (Windows, MacOS, Linux, other)?

3) Why do you need this software?

SUMMARY

DESCRIPTION

FONT (BODY) ⌄ | FONT SIZE ⌄ | B *I* U ⋯ | 📎 🔗 ⋯

ATTACHMENT

PRIORITY

MINOR ⊗ ⌄

SEND | CANCEL

```
User Message Categorization

Message Metadata
Time: HH:JJ
Date: MM/DD/YYYY
Location: Denver, CO
IP Address: QQQ.RR.SSSS.T Message Type: Detected
_ Type A
X Type B
_ Type C Message Sub-type: Undetected
Object Requirement Set for Type A
Attribute 1 - No
Attribute 2 - No
Attribute 3 - No
Attribute 4 – Unknown Object Requirement Set for Type B
Attribute 1 - Yes
Attribute 2 - Yes
Attribute 3 – Unknown Object Requirement Set for Type C
Attribute 1 - No
Attribute 2 - No
Attribute 3 – No
Attribute 4 – Unknown
Attribute 5 - No
```

User Message Categorization
Message Metadata
Time: HH:JJ
Date: MM/DD/YYYY
Location: Denver, CO
IP Address: QQQ.RR.SSSS.T
Message Type: Confirmed
_ Type A
X Type B
_ Type C Message Sub-type: Confirmed
_ Subtype X
X Subtype Y
_ Subtype Z Object Requirement Set for Sub-type X
Attribute 1 - No
Attribute 2 - No
Attribute 3 – Unknown Object Requirement Set for Sub-type Y
Attribute 1 - Yes
Attribute 2 – Yes
Attribute 3 - Yes Object Requirement Set for Sub-type Z
Attribute 1 - No
Attribute 2 - No

*FIG. 7*

SYSTEM INCLUDING AUTOMATED CONTENT ANALYSIS OF INBOUND EMAIL CONTENT FOR CREATING AN ISSUE OBJECT FOR AN ISSUE TRACKING SYSTEM

TECHNICAL FIELD

Embodiments described herein relate to application software such as information technology service management (ITSM) systems, and in particular, to an inbound request handler for analyzing content of inbound emails to automatically create issue tracking objects of an issue tracking system.

BACKGROUND

Background information described in this specification is background information known to the inventors. Reference to this information as background information is not an acknowledgment or suggestion that this background information is prior art or is common general knowledge to a person of ordinary skill in the art.

An ITSM system allows an organization to build and operate an information technology (IT) service desk to address various service issues. However, for large organizations that may generate a diverse set of requests, it may be difficult to define and route issues to an appropriate help desk. In circumstances where requests from users are in an unstructured format including, for example free form text entered in an email message or other similarly formatted electronic communication, it can be difficult to route and service the request using a traditional issue tracking system.

SUMMARY

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

An embodiment described herein can take the form of a computer-implemented method for handling inbound service requests. The method starts by receiving an email message at an inbox of an inbound request handler service. Content of the message is analyzed to extract a set of features. A feature vector based on the set of features extracted from the message, is generated. A categorization metric for the feature vector is then determined, using a set of predetermined categorization vectors, wherein each predetermined categorization vector corresponds to a respective portal endpoint of a set of multiple portal endpoints of an information technology service management system. The respective portal endpoint defines one or more predefined ticket types and one or more predefined ticket sub-types associated with historical issue objects created using the respective portal endpoint. Subsequently, in response to the categorization metric satisfying a comparison criteria with respect to one or more predetermined categorization vectors, a particular portal endpoint of the set of multiple portal endpoints is selected. Content from the email message is then extracted, and a new issue object request is automatically generated in accordance with a particular object requirement set associated with the particular portal endpoint. Finally, the new issue object request is submitted to an issue tracking system thereby causing a new issue object to be created within the issue tracking system.

Another embodiment described herein can take the form of a system for handling inbound service requests. The system includes an inbound request handler service communicably coupled to an issue tracking system over a network. The inbound request handler service includes one or more processors and non-transitory computer-readable storage media having instructions stored therein for execution by the one or more processors to perform a method. The method starts by receiving an email message from a client device, wherein the email message includes a service request. Content of the message is analyzed to define a feature set. A categorization metric for the feature set is then determined, using a set of predetermined categorization feature sets, wherein each predetermined categorization feature set corresponds to a respective portal endpoint of a set of multiple portal endpoints of an information technology service management system. The respective portal endpoint defines one or more predefined ticket types and one or more predefined ticket sub-types associated with historical issue objects created using the respective portal endpoint. Subsequently, in response to the categorization metric satisfying a comparison criteria with respect to one or more predetermined categorization feature sets, a particular portal endpoint of the set of portal endpoints is selected. Content from the email message is then extracted, and a new issue object request is automatically generated in accordance with a particular object requirement set associated with the particular portal endpoint. Finally, the new issue object request is submitted to the issue tracking system thereby causing a new issue object to be created within the issue tracking system.

Yet another embodiment described herein can take the form of another computer-implemented method for handling inbound service requests. The method starts by receiving a first email message from a client device, wherein the email message includes a service request. Body of the first email message is analyzed to extract a first set of features. A first feature vector having one or more of the extracted features of the first email message, is generated. The first feature vector is analyzed with respect to a set of predetermined categorization vectors to identify a respective portal endpoint of a set of multiple portal endpoints of an information technology service management system. In response to the first feature vector being insufficient to identify the respective portal endpoint, a system-generated email having a request for information regarding data related to the one or more predetermined categorization vectors, is automatically generated. Subsequently, in response to receiving a second email message responsive to the system-generated email, the body of the second email message is analyzed to extract a second set of features, and a second feature vector is generated using the first set of features and the second set of features. The second feature vector is then analyzed with respect to the set of predetermined categorization vectors to identify the respective portal endpoint of the set of portal endpoints. Content from the first email message is then extracted, and a new issue object request is automatically generated in accordance with a particular object requirement set associated with the particular portal endpoint. Finally, the new issue object request is submitted to an issue tracking system thereby causing a new issue object to be created within the issue tracking system.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

FIG. 3B depicts an example portal interface associated with a web portal endpoint defining a ticket type, according to certain aspects of the present disclosure.

FIG. 3C depicts an example portal interface associated with a web portal endpoint defining a first ticket sub-type of the ticket type of FIG. 3B, according to certain aspects of the present disclosure.

FIG. 5 depicts an example sufficiency assessment of message content against an object requirement set for determining whether contents from the email message in FIG. 4 can be associated with a particular web portal endpoint defining a particular ticket type and a particular ticket sub-type, according to certain aspects of the present disclosure.

FIG. 7 shows an example sufficiency assessment showing confirmation of the particular ticket type and the particular ticket sub-type based on additional data received from the sender in response to the system-generated email message in FIG. 6, according to certain aspects of the present disclosure.

Figure 1:
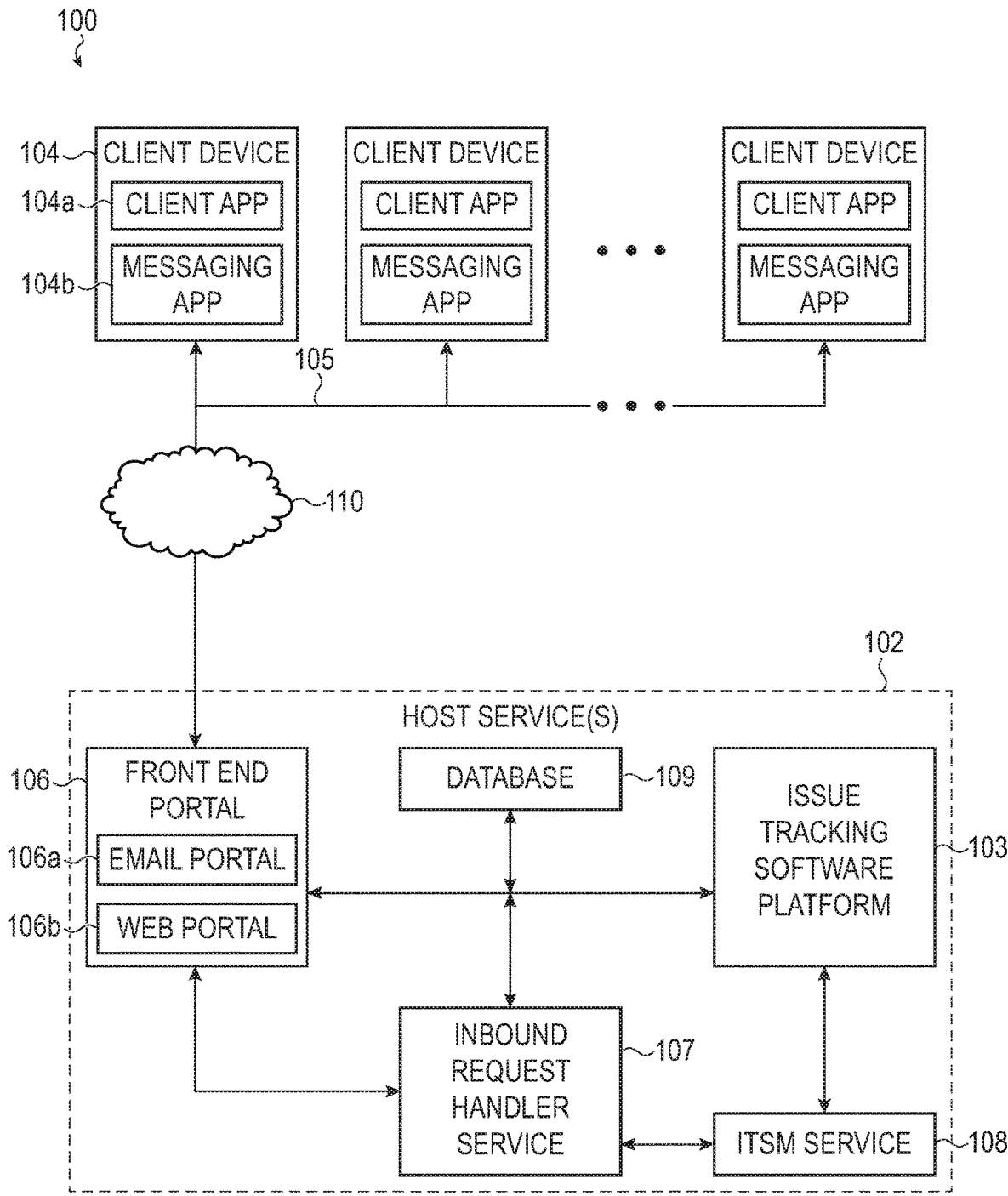
FIG. 1 depicts a schematic representation of an example networked system having an inbound request handler service communicably coupled to one or more client devices, according to certain aspects of the present disclosure.

The use of the same or similar reference numerals in different figures indicates similar, related, or identical items. The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

The present disclosure is susceptible to various modifications and alternative forms, and some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively.

Additionally, directional terminology, such as "top", "bottom", "upper", "lower", "front", "back", "over", "under", "above", "below", "left", "right", etc. is used with reference to the orientation of some of the components in some of the figures described below. Because components in various embodiments can be positioned in a number of different orientations, directional terminology is used for purposes of illustration only and is in no way limiting. The directional terminology is intended to be construed broadly, and therefore should not be interpreted to preclude components being oriented in different ways. These words are intended to relate to the equivalent direction as depicted in a reference illustration; as understood contextually from the object(s) or element(s) being referenced, such as from a commonly used position for the object(s) or element(s); or as otherwise described herein. Further, it is noted that the term "signal" means a waveform (e.g., electrical, optical, magnetic, mechanical or electromagnetic) capable of traveling through a medium such as DC, AC, sinusoidal-wave, triangular-wave, square-wave, vibration, and the like.

Also, as used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

As used herein, the general term "computing resource" (along with other similar terms and phrases, including, but not limited to, "computing device" and "computing network") may be used to refer to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

Currently, service requests coming through an ITSM system are manually handled by an IT service desk agent, who pick up on tickets related to the service requests that are generated in an issue tracking system. As a result, it may be difficult to determine urgency of the request early enough or automatically provide self-help options to the sender right at the outset. Further, it is difficult to route request to an appropriate service desk in a consistent way across an organization in order to provide reliable and efficient ticket processing Accordingly, the embodiments described here relate to systems and methods of handling service requests. While the service requests are represented as requests for technical support in the example embodiments below, it is noted that the service requests may include request for support in various other areas such as, but not limited to, legal, human resources, customer service, marketing, compliance, asset management, etc. As such, the systems and methods described herein are equally relevant and applicable in analyzing content of any such inbound emails to automatically create issue tracking objects in an issue tracking system, as described below.

The service requests are submitted as messages through electronic mail (email), or social media tools such as Whatsapp™, Slack™, Telegram™, or similar messaging applications executed on a client device by a user. In some embodiments, the email may be automatically generated when a user fills out an email form on a web portal. The content in messages are analyzed to determine a predefined ticket type and a predefined ticket sub-type, and then automatically create an issue object (e.g., a ticket) in an issue tracking system), based on such categorization.

The textual content of the email message is analyzed by a feature extraction module in an inbound request handler service to extract a set of features indicative of the nature of the service request. In non-limiting examples, the extracted features can be substantive data such as text, keywords, images, attachments, uniform resource locators (URLs) in the body of the email message, as well as metadata associated with the message such as location, timestamp, IP address, account information of the sender, and the like. The step of feature extraction may be performed by customized or well-known multilingual natural language processing tools such as, but not limited to, the multilingual USE model. A feature vector (alternatively, a feature set) having a subset of the extracted features is then generated by a feature vector generation module of the inbound request handler service.

As a non-limiting example, the email message with a technical service request can be analyzed to find the keywords-"password", "compromise", and "account access", and the metadata such as date and timestamp of receipt. Accordingly, a feature vector with the extracted keywords and metadata may be generated by the feature vector generation module of the inbound request handler service.

The systems for handling inbound service requests include a database having a plurality of historical issue objects (e.g., tickets in an issue tracking system) for similar service requests from the past, where each entry is classified as a ticket type and a ticket sub-type, and includes the resolution provided in response to the corresponding service request. The database is associated with a set of predetermined categorization vectors (alternatively, categorization feature sets) mapping to a set of multiple endpoints, which may include web portal endpoints-a URL or pointer to a webpage (though in different embodiments, can be a URL or pointer to a mobile application page in the ITSM), where each predetermined categorization vector corresponds to a respective web portal endpoint that represents a predefined ticket type and a predefined ticket sub-type, based on entries in the database. In some non-limiting embodiments, each of the endpoints defines a distinct portal interface such as, but not limited to, a web-based interface, a mobile application GUI etc. for creating issue objects (e.g., see web-based portal interfaces 350, 360, and 370 in FIGS. 3B-3D) having a unique set of prompts (e.g., input fields). Each of the set of prompts correspond with an object attribute of a set of object attributes for an object requirement set associated with each web portal endpoint used for a new issue object request on the issue tracking system. Provision of values for each of the object attributes for the object requirement set sufficiently identifies a feature vector as associated with the particular portal defining a particular predefined ticket type and a particular predefined ticket sub-type. Further, in some non-limiting embodiments, each of the web portal endpoints may be accessible via a web-based user interface on a client device.

Continuing with the non-limited example, the predefined ticket types for a service request may be—"Software Request", "License Request", "Account Access Request", "Security Breach Report", "Request to Edit a Chart of Accounts, Product code, and Project Code", and the like. Each of the predefined ticket types may have a number of ticket sub-types. For example, the ticket type "Account Access Request" can have the predefined ticket sub-types— "User Account Access", "Agent Account Access", "Bot Account Request", and the like. Similarly, the ticket type "Security Breach Report" can have the predefined ticket sub-types—"Password Breach", "Malware Attack", "Unauthorized File Changes", and the like. Accordingly, an object requirement set associated with a particular web portal endpoint and thus, corresponding to a particular predetermined categorization vector may include a set of object attributes that are needed to categorize the inbound service request as belonging to that particular ticket type and that particular ticket sub-type.

The feature vector generated by the feature vector generation module is analyzed with respect to the set of predetermined categorization vectors in the database and/or the associated object requirement set to define a categorization metric. In some non-limiting embodiments, a number of preprocessing techniques (e.g., denoising, normalization, dimensional reduction, etc.) may be used before the feature vector is analyzed.

Upon determining that the categorization metric satisfies a comparison criteria (e.g., a predefined threshold) with respect to one or more of the predetermined categorization vectors, the feature vector of the email message is associated with a particular web portal endpoint that defines a particular predefined ticket type and a particular predefined ticket sub-type. In some non-limiting embodiments, satisfaction of the comparison criteria may also simultaneously mean that the features extracted from the email message provide values for each object attribute of the set of object attributes in the object requirement set associated with the particular web portal endpoint, thereby identifying it. The particular web portal endpoint is then selected from the set of multiple web portal endpoints in the ITSM. In other embodiments, fulfilling the values of the set of object attributes in the object requirement set occurs after identification of the particular web portal endpoint.

In some embodiments, upon determining that the categorization metric does not satisfy the comparison criteria and the content/features extracted from the email message are insufficient to provide values for each object attribute of the set of object attributes associated with any of the web portal endpoints, the inbound request handler service may automatically send, through an associated email portal, a system-generated email message to the client device or sender of the email message requesting additional content corresponding to the missing values for the set of object attributes, such that the missing values can be used to determine whether the service request is associated with a particular web portal endpoint. In such embodiments, any responsive email message returned in response to the system-generated email message is further analyzed to extract additional content/ features. Accordingly, a second feature vector may be generated using the features of the initial feature vector and the features extracted from the responsive email message expected to provide one or more missing values for the set of object attributes. This second feature vector is then analyzed with respect to the set of predetermined categorization vectors to determine whether a revised categorization metric based on the second feature vector satisfies the comparison criteria and identifies which web portal endpoint the second feature vector corresponds to. In some embodiments, if the revised categorization metric still does not satisfy the comparison criteria with respect to one or more predetermined categorization vectors, the inbound request handler service may automatically send another system-generated email message requesting additional content, and the process may continue until a particular web portal endpoint can be sufficiently identified.

The system then proceeds to extract all content from the email messages and automatically generates a new issue object request, according to a particular object requirement set associated with the identified web portal endpoint. The new issue object request is subsequently submitted into an issue tracking system (for example, Jira® Service Management platform developed by the Applicant) to create an issue object (e.g., a Jira® ticket) before any action is initiated for resolving it. In some embodiments, the system may also automatically assign a priority level of the generated IT ticket based on severity of the service request. This may allow IT tickets to be directed according to available resources and team members based on the priority level.

In some non-limiting embodiments, the categorization metric may be a similarity measure (e.g., cosine similarity, Euclidean distance, Manhattan distance, Jaccard similarity, etc.) or a similarity score (e.g., a percentage, points on a scale of 100, etc.) that is generated by comparing the feature vector against each predetermined categorization vector. In other embodiments, the categorization metric may be based on a non-vector similarity comparison techniques such as, but not limited to, Latent Semantic Indexing, Document Centroid Vector, Word Mover's Distance, and the like.

Continuing with the non-limiting example described above, if the categorization metric is a similarity score, the system determines how similar (e.g., 60% match, 70% match, 80% match, 90% match, etc.) the feature vector having the extracted keywords "password", "compromise", and "account access", and the metadata such as date and time of the sender, is to the predetermined categorization vector corresponding to the particular web portal endpoint defining the predefined ticket type "Security Breach Report" and the predefined ticket sub-type "Password Breach". If there is a 90% match, the system may determine that the inbound technical service request can be definitely categorized as corresponding to the particular web portal endpoint defining the ticket type "Security Breach Report" and the ticket sub-type "Password Breach". However, if there is a 60% match, the system cannot sufficiently identify that the inbound technical service request corresponds to any particular web portal endpoint. Accordingly, the system may assess the extracted keywords "password", "compromise", and "account access", and the metadata such as date and time of the sender against an object requirement set associated with the particular web portal endpoint defining the ticket type "Security Breach Report" and the ticket sub-type "Password Breach". Accordingly, the system may identify one or more object attributes from the associated object requirement set (e.g., session identity of last login, username for online account, etc.) that do not correspond with the extracted keywords or the metadata, and seek such missing values of the set of object attributes in the object requirement set from the sender in order to provide additional features to the feature vector for more accurate categorization of the inbound technical service request.

In yet other non-limiting embodiments, the categorization metric may be a classification metric (e.g. an associated confidence level in percentage) generated by a classification model which predicts whether the feature vector is associated with the particular web portal endpoint defining the ticket type and/or the ticket sub-type. The classification model may be trained using the historical issue objects stored in the database.

Continuing with the non-limiting example described above, if the categorization metric is an associated confidence level produced by a classification model, the system may determine how likely (for example, at 80% confidence level, at 90% confidence level, etc.) is the feature vector having the extracted keywords "password", "compromise", and "account access", and the metadata such as date and time of the sender, to satisfy a minimum threshold distance to the predetermined categorization vector corresponding to the particular web portal endpoint defining the predefined ticket type "Security Breach Report" and the predefined ticket sub-type "Password Breach" in order to be categorized in that particular ticket type and that particular ticket sub-type. If there is a 90% confidence that feature vector can be categorized as such, the system may determine that the inbound technical service request can be definitely categorized as corresponding to the particular web portal endpoint defining the ticket type "Security Breach Report" and the ticket sub-type "Password Breach". However, if there is a 60% confidence, the system cannot sufficiently identify that the inbound technical service request corresponds to any particular web portal endpoint. Accordingly, the system may assess the extracted keywords "password", "compromise", and "account access", and the metadata such as date and time of the sender against an object requirement set associated with the particular web portal endpoint defining the ticket type "Security Breach Report" and the ticket sub-type "Password Breach". Accordingly, the system may identify one or more object attributes from the associated object requirement set (e.g., session identity of last login, username for online account, etc.) that do not correspond with the extracted keywords or the metadata, and seek such missing values of the set of object attributes in the object requirement set from the sender in order to provide additional features to the feature vector for more accurate categorization of the inbound technical service request.

Once the issue object is generated in the issue tracking system based on the particular web portal endpoint defining the ticket type and the ticket sub-type, the issue resolution may be provided in different ways. In some non-limiting embodiments, the issue may be resolved by delivering one or more knowledge base resources (e.g., self-help articles) to the sender of the email message, where the knowledge base articles are selected based on the ticket type and the ticket sub-type. In other words, the knowledge base resource provided to the sender of the email message is based on content and features extracted from the email message. In other embodiments, the issue may be resolved by providing a similar solution as a past historical issue object having the same ticket type and the ticket sub-type, or by automatically notifying a IT team member equipped to handle issues of the same kind.

Advantageously, the systems and methods described herein can benefit both users and IT service desk agents. Inbound service requests with high priority are quickly recognized and resolved. Moreover, there is a reduction in the number of messages between the users and IT service desk agents, as well as reduction in the time to receive additional data related to or context of the issue requiring support. Ultimately, the systems and methods described herein provide efficient resolution of service requests through reduced resolution time, high satisfaction, and better outcomes for service level agreements based on issue type, without compromising on the quality of IT support service.

FIG. 1 depicts a schematic representation of an example networked system 100 delivering an inbound request handler service communicably coupled to one or more client devices 104. In the illustrated embodiment, the networked system 100 is implemented with a client-server architecture including a host service 102 that communicably couples (e.g., via one or more networking or wired or wireless communication protocols) to the client devices 104. In the example shown in FIG. 1, the client devices 104 are connected to the host service over a cloud network 110. However, in different embodiments, different client devices 104 can be configured differently and/or may transact data or information with, and/or provide input(s) to, the host service 102 in a unique or device-specific manner.

The client device 104 can be any suitable personal or commercial electronic device and may include, without limitation or express requirement, resource allocations such as one or more processors, one or more memories, and the like. Example electronic devices include, but are not limited to: laptop computers, desktop computers, cellular phones, tablet computing devices, and so on. It may be appreciated that the client device 104, such as described herein, can be implemented in any suitable manner, and in some embodiments, interconnected over a communications bus 105. More importantly, each client device 104 includes a client application 104a and a messaging application 104b. The client application 104a is configured to access and communicate with the host service 102 and to securely transact information or data with, and provide input(s) to, the host service 102. In some embodiments, the client application 104a may be a browser application configured to access a web page or service hosted by the host service 102 that is accessible to the client device 104 over a private or public network such as the open internet. In various embodiments, the messaging application 104b may be an email application, Whatsapp™, Slack™, Telegram™, and the like, and configured to send a message to the host service 102 seeking to report or discuss service issues.

In many embodiments, the host service 102 is configured to operate within or as a virtual computing environment that is supported by one or more physical servers including one or more hardware resources such as, but not limited to (or requiring) one or more of: a processor allocation, a memory allocation (also referred to as a working memory), non-volatile storage (also referred to as persistent memory), networking connections, and the like. For simplicity of description and illustration, these example hardware resources are not shown in FIG. 1.

The host service 102 may include or be communicably coupled to (for example, over the cloud network 110) an issue tracking system (ITS) platform 103 (alternatively "issue tracking platform"), which provides issue tracking services for creating, managing, and tracking issues for information technology service management (ITSM) services.

In different embodiments, the host service 102 can include a number of discrete subservices or purpose-configured modules, containers, or virtual machines each configured to perform, coordinate, serve, or otherwise provide one or more services, functions, or operations of the host service 102. These include a front end portal 106 having an email portal 106a and a web portal 106b, an inbound request handler service 107, an ITSM service 108, a database 109, and an issue tracking system (ITS) platform 103. It may be appreciated that each of these functional elements include allocations of physical or virtual resources—such as one or more processors, memory, and/or communication modules (e.g., network connections and the like)—though such an implementation is not required. More generally, it may be appreciated that the various functions described herein of a host service 102 can be performed by any suitable physical hardware, virtual machine, containerized machine, or any combination thereof.

The front end portal 106 is configured to receive communication from the client devices 104 communicably coupled to the host service 102 either via the email portal 106a or the web portal 106b. The email portal 106a is configured to receive email messages from the client device(s) 104, and subsequently route the email messages to the inbound request handler service 107 for processing. The email portal 106a is also configured to transmit any system-generated email messages to the client device(s) 104. The web portal 106b provides a series of webpages or web content that can be used to route a user with a technical service request to a particular portal interface for creating issue objects of a predefined ticket type and a predefined ticket sub-type, based on their input. Accordingly, there are a plurality of portal interfaces, where each portal interface includes a set of prompts where the user can provide inputs for creating new issue object requests (e.g. ticket requests).

The database 109 includes a plurality of entries of historical issue objects corresponding to past technical service requests, and their respective resolutions, as well as a knowledge base of resources for addressing various service issues.

Figure 2:
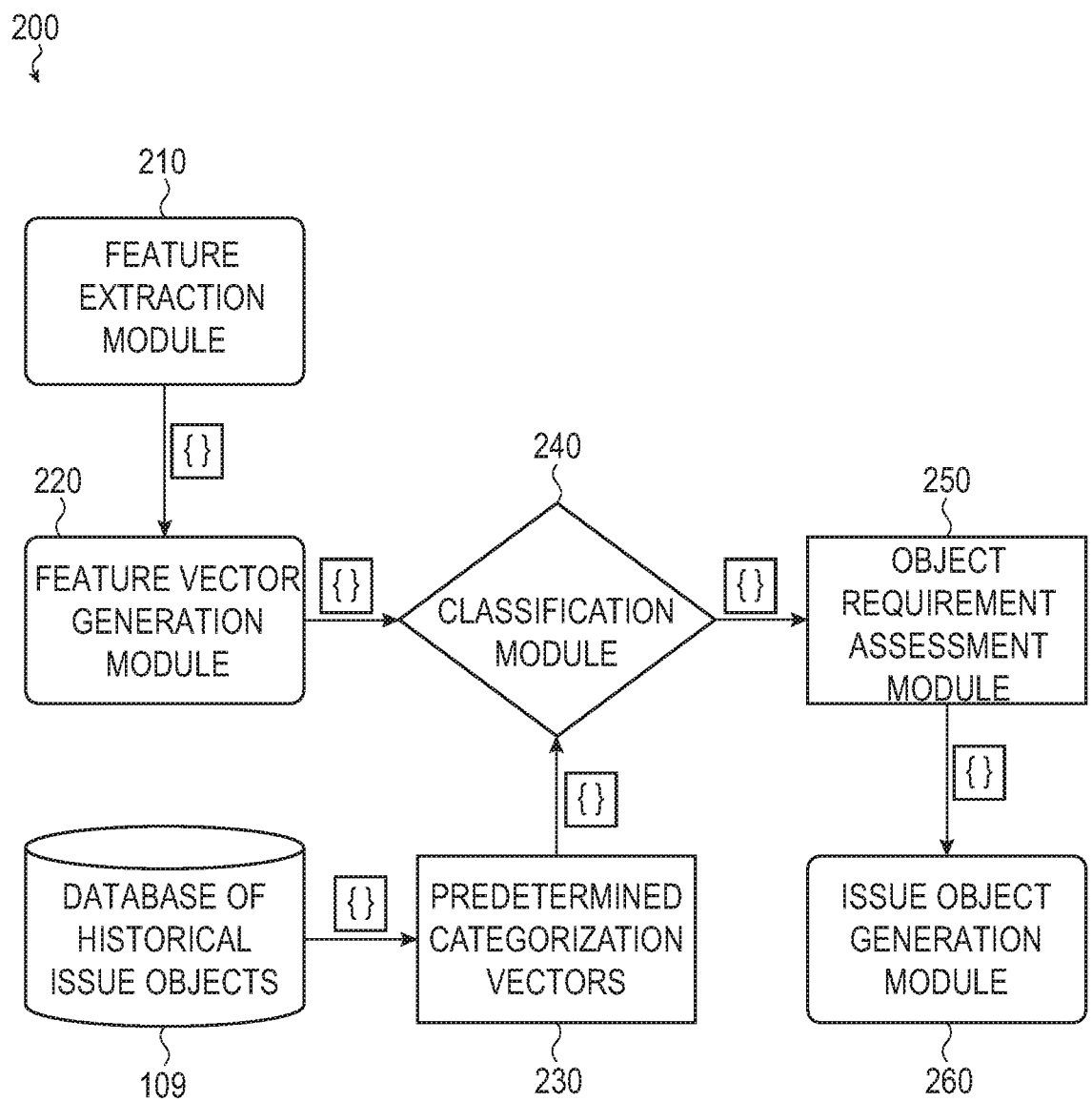
FIG. 2 depicts an example inbound request handler service implemented in the networked system of FIG. 1, according to certain aspects of the present disclosure.

The inbound request handler service 107, as further described with respect to FIG. 2, includes a number of modules that are collectively configured to analyze content of messages—received from the client devices 104 and/or forwarded by the email portal 106a—to determine categorization and priority levels of the technical service requests using the database 109. The inbound request handler service 107 is configured to extract content and/or features (e.g. substantive data, text, images, metadata, etc.) from messages using customized or well-known multilingual natural language processing tools. The inbound request handler service 107 is configured to generate a feature vector (alternatively, feature set) based on the extracted features, and analyze the feature vector to determine (and identify) whether the feature vector corresponds to a particular web portal endpoint defining a ticket type and a ticket sub-type. Further, the inbound request handler service 107 is also configured to generate a system-generated email message to seek any missing information, if the particular web portal endpoint cannot be sufficiently identified. Once the identification of the particular web portal endpoint is complete, the inbound request handler service 107 is configured to transmit the categorization information to the ITSM service 108.

The ITSM service 108 is configured to service IT-related requests from the web portal 106b and the inbound request handler service 107. The ITSM service 108 is communicably coupled to and interfaces with the ITS platform 103 to generate and submit issue object requests (i.e. ticket requests). The ITSM service 108 is configured to receive categorization data from the inbound request handler service 107 that helps generate the issue object requests. The ITSM service 108 is also provides an interface for IT service managers to track issue objects, their resolutions, IT service desk productivity, as well as check on adequacy of data, before generating an issue object request (e.g., IT ticket request).

The ITS platform 103 is communicably coupled to the ITSM service 108. The ITS platform 103 creates an issue object (e.g., an IT ticket) having a ticket type and a ticket sub-type based on issue object request from the inbound request handler service 107. The ITS platform 103 tracks the issue through an issue workflow-a series of issue states that must be completed to resolve the issue.

The various functionalities of the front end portal 106, the inbound request handler service 107, the ITSM service 108, the database 109, and the ITS platform 103 are further described with respect to the different embodiments below.

It may be appreciated that the foregoing embodiment depicted in FIG. 1 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

FIG. 2 depicts an example of the inbound request handler service 107 described above. The inbound request handler service 107 employs a classification model, and thus uses a classification metric such as a confidence level, as a categorization metric for analyzing content of the message with the technical service request. The data flowing through different modules of the inbound request handler service 107 has a JSON data structure format, as indicated by { }. The inbound request handler service 107 includes a feature extraction module 210, a feature vector generation module 220, a roster of predetermined categorization vectors 230, a classification module 240, an object requirement assessment module 250, and an issue object generation module 260. However, in different embodiments, where the inbound request handler service 107 uses a similarity score as a categorization metric, the classification module 240 may be replaced by a similarity score module.

The feature extraction module 210 is configured to parse the email message to extract features including substantive data such as text, keywords, images, attachments, uniform resource locators indicative of the service issue, as well as metadata associated with the message such as location, date, IP address and account information of the sender, and the like. In a non-limiting example, a multilingual natural language processing technique (e.g., USE) can be used to parse text and sentiments in the message, and then the extracted words in the text can be compared to items in one or more data dictionaries associated with the feature extraction module 210.

The feature vector generation module 220 is configured to generate a high-dimensional feature vector (alternatively, a feature set) having one or more of the features extracted by the feature extraction module 210. The feature vector concisely represents the characteristics of the message with the technical service request, and is configured for processing by the classification module 240, such as one or more neural networks.

The roster of predetermined categorization vectors 230 is a list based on a plurality of historical issue objects corresponding to past technical service requests that are stored in the database 109 described above. Each entry of the database 109 is classified as a predefined ticket type and a predefined ticket sub-type, and includes the resolution provided in response to the corresponding technical service request. Accordingly, each predetermined categorization vector (alternatively, predetermined categorization feature set) in the roster 230 may be associated with particular web portal endpoint defining a particular ticket type and a particular ticket sub-type based on entries in the database 109. In some non-limiting embodiments, each of the web portal endpoints defines a distinct portal interface for creating issue objects (e.g., see web-based portal interfaces 350, 360, and 370 in FIGS. 3B-3D) having a unique set of prompts that match with a set of object attributes for an object requirement set associated with each web portal endpoint, as described above. Provision of values for each of the object attributes for the object requirement set sufficiently identifies a feature vector as associated with the particular web portal endpoint defining a particular predefined ticket type and a particular predefined ticket sub-type.

The classification module 240 takes the feature vector generated by the feature vector generation module 220 as input, and is configured to classify the feature vector as having a particular ticket type and a particular ticket sub-type. The classification module 240 includes feature transform logic and machine learning logic. The feature transform logic transforms the feature vector into data (e.g., by normalizing the features into values) that is recognizable by the machine learning logic. The values to which the features are normalized depend on the type of machine learning logic, and an associated weighting scheme.

A machine-learning logic is an algorithm that takes as input a training set of issue objects (e.g., tickets) labeled with the different predefined ticket types and the predefined ticket sub-types, and outputs the correct or closest predefined ticket type and the predefined ticket sub-type into which the feature vector can be categorized into. In different embodiments, the machine learning logic can be a logistic regression algorithm, a support vector machine learning algorithm, a decision tree learning algorithm, a convolutional neural network learning algorithm, or another well-known classification algorithm. The machine learning logic in the classification module 240 may be trained using the plurality of historical issue objects in the database 109. In operation, the machine learning logic receives the normalized values of the feature vector from the feature transform logic, and determines a classification of the feature vector, for example, through a deep learning process.

The output of the classification is a particular web portal endpoint defining a particular predefined ticket type and a particular predefined ticket sub-type that are likely to be associated with the feature vector, and includes a corresponding categorization metric, such as an assigned confidence level. The confidence level may be determined as high, medium, low, none, or alternatively expressed as a percentage. In a non-limiting example, the classification module 240 may determine how likely the feature vector is to satisfy a comparison criteria (e.g., a minimum threshold distance) with respect to the predetermined categorization vector associated with the particular web portal endpoint defining the particular predefined ticket type and the particular predefined ticket sub-type for being categorized as such. Accordingly, the inbound request handler service 107 may determine whether or not to seek additional data from the sender, so that the feature vector with features based on such additional data can be more accurately analyzed against the predetermined categorization vector.

Successful outcomes using the classification module 240 can create pairs of values—feature vector and corresponding categorization—that may become part of the training set used to continuously train the classification model used by the classification module 240.

The foregoing example of the classification module 240 is not exhaustive and it may be appreciated that other data or content may be used to train, update, and/or define or inform one or more operations of the classification module 240. Further, it may be appreciated that in some embodiments training data supplied to, and consumed by, the predictive model of the classification module 240 can be limited, curated, or otherwise tailored in any suitable manner. Alternatively, training data can be entirely unlimited and may span different users, different instances of different collaboration tools, and so on. In different embodiments, different training data—or sets of training data—may be appropriate, preferred, or otherwise used.

It may be further noted that in some embodiments, a similarity score module may be used instead of the classification module 240. The similarity score module may be configured to determine the categorization metric as a similarity measure (e.g., cosine similarity, Euclidean distance, Manhattan distance, Jaccard similarity, etc.) or a similarity score (e.g., a percentage, points on a scale of 100, etc.) that is generated by comparing the feature vector against each predetermined categorization vector. In other embodiments, the categorization metric may be based on a non-vector similarity comparison techniques such as, but not limited to, Latent Semantic Indexing, Document Centroid Vector, Word Mover's Distance, and the like.

Accordingly, the similarity score module may determine how similar (e.g., 60% match, 70% match, 80% match, 90% match, etc.) the feature vector is to the predetermined categorization vector for a particular predefined ticket type and a particular predefined ticket sub-type. For example, if there is a 90% match, the similarity score module may determine that the inbound technical service request has the particular predefined ticket type and the particular predefined ticket sub-type. As another example, if there is a 60% match, additional data may be requested from the sender, so that the feature vector with features based on such additional data can be more accurately mapped against the predetermined categorization vector.

The object requirement assessment module 250 assesses the features of the feature vector against an object requirement set having a set of object attributes associated with each of the web portal endpoints defining a particular ticket type and a particular ticket sub-type. If the confidence level assigned to the classification from the classification module 240 is not high enough (e.g., 50% confidence level, 60% confidence level, low similarity score), the object requirement assessment module 250 identifies one or more object attributes from the associated object requirement set that do not correspond with the extracted features and/or content from the email message. Such missing values of the set of object attributes in the object requirement set are then requested from the sender in order to provide additional features to the feature vector for more accurate categorization of the inbound technical service request.

The issue object generation module 260 is used to generate issue object requests based on the categorization and priority levels associated with the feature vector. If the confidence level assigned to the classification from the classification module 240 satisfies a threshold (e.g., 90% confidence level, 95% confidence level, high similarity score), the issue object generation module 260 generates an issue object request (e.g., IT ticket request) corresponding to the particular web portal endpoint defining the particular predefined ticket type and the particular predefined ticket sub-type, as determined by the classification module 240. In some embodiments, the issue object generation module 260 may be configured to determine a priority level of the issue object request based on severity of the technical service request, which in turn, may be based on predefined criteria. This may allow appropriate allocation of resources and team members to the generated IT tickets based on the priority level.

Although the various modules with the inbound request handler service 107 are depicted as separate modules, the modules can be integrated into a single module in other implementations. Further, some of the modules in the inbound request handler service 107 can be integrated in one or more other modules, or altogether omitted in other embodiments.

It may be appreciated that the foregoing examples are not exhaustive. More generally and broadly, it is appreciated that the inbound request handler service 107 can be configured to leverage, utilize, or employ any suitable pattern recognition or classification algorithm, probabilistic model, machine learning technique (whether trained or untrained), artificial intelligence method, or any suitable combination thereof, to detect, define, determine, or otherwise infer one or more patterns in, and/or logical or causal relationships between specified or extracted topics, different user inputs, different issue content, successions or sequences of issues, or groups of issues reported to the ITSM service 108, and how those issues have been resolved over time.

Figure 3A:
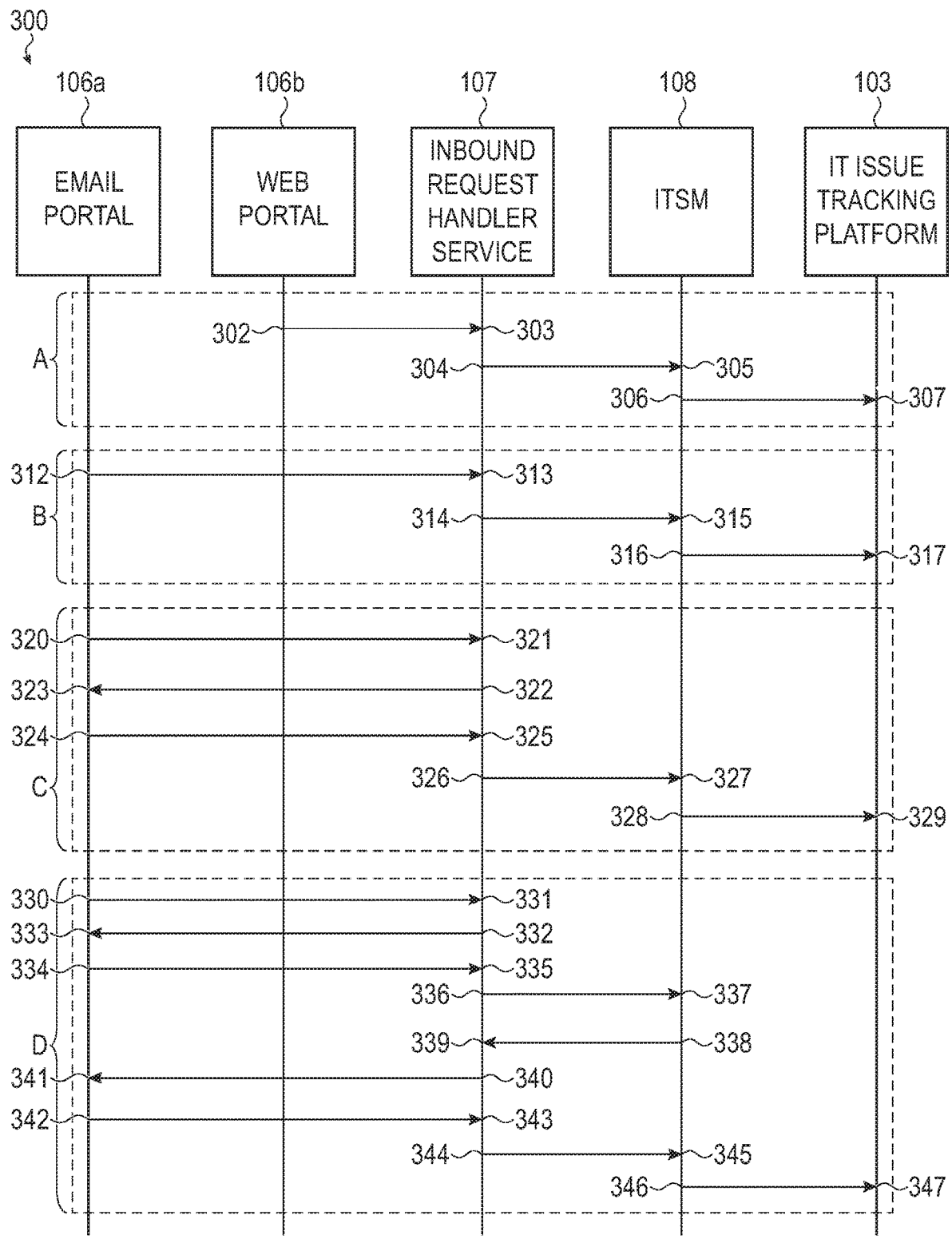
FIG. 3A depicts a flow diagram showing various scenarios of data flow from receiving a message with a service request to forming an issue in an issue tracking system platform using issue object generated by an ITSM shown in FIG. 1, based on message content analyzed by the inbound request handler service shown in FIG. 1, according to certain aspects of the present disclosure.

FIG. 3A depicts a flow diagram 300 showing four scenarios—A, B, C, and D—of data flow from receiving an email message with a technical service request to forming an issue object in the issue tracking system (ITS) platform 103 using issue object requests generated by the ITSM service 108, based on message content analyzed by the inbound request handler service 107 shown in FIG. 1. Data flows from the email portal 106a, the web portal 106b, through the inbound request handler service 107, and the ITSM service 108 which generates a new issue object request for the ITS platform 103. The data flow concludes at the ITS platform 103, which creates the issue object based on the issue object request to initiate and track a resolution.

Scenario A presents data flow when the email message with a technical service request is generated by the web portal 106b based on inputs from a user. In operation 302-303, the technical service request is transmitted from the web portal 106b to the inbound request handler service 107, which determines whether the contents of the email message can be definitely associated with a particular web portal endpoint defining a particular ticket type and a particular ticket sub-type. Assuming that such categorization is accompanied by a high confidence level or a high similarity score, when a feature vector based on the extracted contents is analyzed with respect to one or more predetermined categorization vectors, the categorized feature vector is transmitted, in operation 304-305, to the ITSM service 108 for generating a new issue object request. The ITSM service 108 checks for adequacy of data on the categorized feature vector before generating the new issue object request. Subsequently, in operation 306-307, the issue object request is sent directly from the ITSM service 108 to the ITS platform 103.

According to embodiments described herein, Scenario B presents data flow when the email message received at the email portal 106a is categorized with high similarity measure, high similarity score, or high confidence level by the inbound request handler service 107, without requiring further data from the sender. In operation 312-313, the technical service request is transmitted from the email portal 106a to the inbound request handler service 107, which determines whether the contents of the email message can be definitely associated with a particular web portal endpoint defining a particular ticket type and a particular ticket sub-type with a high confidence level or a high similarity score, when a feature vector based on the contents extracted from the email message is analyzed with respect to one or more predetermined categorization vectors. Assuming that such categorization is accompanied by a high confidence level or a high similarity score, in operation 314-315, the categorized feature vector is sent to the ITSM service 108 for generating a new issue object request. The ITSM service 108 checks for adequacy of data on the categorized feature vector before generating the new issue object request. Subsequently, in operation 316-317, the ITSM service 108 transmits the new issue object request to the ITS platform 103.

According to embodiments described herein, Scenario C presents data flow when the email message received at the email portal 106a cannot be categorized with sufficient accuracy or confidence level by the inbound request handler service 107 due to missing data. In some embodiments, a sufficiency metric that estimates an extent to which a feature vector based on the contents extracted from the email message is featurized for categorization, may be used. In operation 320-321, the technical service request is transmitted from the email portal 106a to the inbound request handler service 107, which attempts to determine whether the contents and/or features of the email message can be definitely associated with a particular web portal endpoint defining a particular ticket type and a particular ticket sub-type with a high confidence level or a high similarity score, when the feature vector is analyzed with respect to one or more predetermined categorization vectors. This can be accomplished by determining whether the features of the feature vector provide values for each object attribute of a set of object attributes in a particular object requirement set associated with the particular web portal endpoint.

In operation 322-323, upon determining that categorized feature vector has low confidence level of categorization, a low similarity score when analyzed with respect to a predetermined categorization vector, or alternatively, does not the satisfy a comparison criteria (e.g., a threshold) for categorization, a system-generated message is sent to the sender of the message requesting the missing data corresponding to the missing values of the set of object attributes in the particular object requirement set.

In operation 324-325, the sender responds with the requested missing data in a second email message, which is transmitted to the inbound request handler service 107, which extracts the contents and/or features from the second email message, and generates an updated feature vector including contents and/or features extracted from both email messages. Accordingly, the updated feature vector is again analyzed with respect to the predetermined categorization vector to determine if the categorization metric-whether a classification metric or a similarity score-satisfies the comparison criteria (e.g., a threshold) with respect to the predetermined categorization vectors in order to obtain a categorization having a high confidence level or a high similarity score. Assuming that such categorization is accompanied by a high confidence level or a high similarity score, in operation 326-327, the categorized feature vector is sent to the ITSM service 108 for generating a new issue object request. The ITSM service 108 checks for adequacy of data on the categorized feature vector before generating the new issue object request. Subsequently, in operation 328-329, the ITSM service 108 transmits the new issue object request to the ITS platform 103.

According to embodiments described herein, Scenario D presents data flow when the email message received at the email portal 106a is not only unable to be categorized with high similarity measure, high similarity score, or high confidence level by the inbound request handler service 107, but also returned by the ITSM service 108 due to inadequate data. In operation 330-331, the technical service request is transmitted from the email portal 106a to the inbound request handler service 107, which attempts to determine whether the contents and/or features of the email message can be definitely associated with a particular web portal endpoint defining a particular ticket type and a particular ticket sub-type with a high confidence level or a high similarity score, when a feature vector based on contents and/or features extracted from the email message is analyzed with respect to one or more predetermined categorization vectors. This can be accomplished by determining whether the features of the feature vector provide values for each object attribute of a set of object attributes in a particular object requirement set associated with the particular web portal endpoint.

In operation 332-333, upon determining that categorized feature vector has low confidence level of categorization, a low similarity score when analyzed with respect to a predetermined categorization vector, or alternatively, does not the satisfy a comparison criteria (e.g., a threshold) for categorization, a system-generated message is sent to the sender of the message requesting the missing data corresponding to the missing values of the set of object attributes in the particular object requirement set.

In operation 334-335, the sender responds with the requested missing data in a second email message, which is transmitted to the inbound request handler service 107, which extracts the contents and/or features from the second email message, and generates an updated feature vector including contents and/or features extracted from both email messages. Accordingly, the updated feature vector is again analyzed with respect to the predetermined categorization vector to determine if the categorization metric-whether a classification metric or a similarity score-satisfies the comparison criteria (e.g., a threshold) with respect to the predetermined categorization vectors in order to obtain a categorization having a high confidence level or a high similarity score. Assuming that such categorization is accompanied by a high confidence level or a high similarity score, in operation 336-337, the categorized feature vector is sent to the ITSM service 108 for generating a new issue object request.

The ITSM service 108 checks for adequacy of data on the categorized feature vector and determines that there is inadequate data. Accordingly, in operation 338-339, the ITSM service 108 requests for additional data from the inbound request handler service 107. In operation 340-341, the inbound request handler service 107 sends the request for the additional data to the email portal 106a to be delivered to the sender of the email message.

In operation 342-343, the sender responds with the requested additional data, which is received at the email portal 106a and transmitted to the inbound request handler service 107. In operation 344-345, the inbound request handler service 107 forwards the additional data to the ITSM service 108. The ITSM 308 checks again for adequacy of data on the categorized vector, and upon determination that no further data is needed, proceeds to generate a new issue object request. Subsequently, in operation 346-347, the ITSM service 108 transmits the new issue object request to the ITS platform 103.

FIG. 3B depicts an example portal interface 350 associated with a web portal endpoint for 'Accounts, Access, and Software Requests', for which a user on a client device 104 would be directed to for submitting their technical service request. The example web-based portal interface 350 includes a header 352 indicating the title of the web portal 'IT Service Desk'. A number of ticket types are available for a user to select on the example portal interface 350. These include the ticket Type 353—'Software and/or License Request', ticket Type 354—'Submit an Access Request', ticket Type 355—'Request a Bot Account', ticket Type 356—'Report a Security Issue', and ticket Type 357—'Chart of Accounts, Department, Product Code, Project Code & Subsidiary Changes'. A user can select any one of these five ticket Types 353-357 to navigate to a portal interface (shown in FIGS. 3C-3D) for a corresponding ticket Sub-Type, which includes a set of prompts seeking user input on the issue requiring support. Accordingly, each web portal endpoint defining a particular ticket Type and a particular ticket Sub-type is associated with an object requirement set having a set of object attributes, where each object attribute maps to each prompt seeking user input. This ensures that upon sufficient information inputted by the user for each prompt in the email message, a particular web portal endpoint end defining a particular ticket type and ticket sub-type can be selected.

FIG. 3C depicts an example portal interface 360 associated with a portal web endpoint defining a first ticket sub-type of the ticket type 353—'Software and/or License Request' from FIG. 3B. The example web-based portal interface 360 includes a header 362 indicating the title of the web portal 'IT Service Desk', and a sub-header 364 indicating the ticket type 353—'Software and/or License Request' from FIG. 3B. Under the sub-header 364, an instruction box 363 provides instructions to the user on how to submit information for the first sub-type. In particular, the instruction box 363 includes a number of prompts "What software do you need?", "What is your company's Operating System? (Windows, Mac, Linux)", and "Why do you need this software?" Each of these three prompts are unique to this ticket type and ticket sub-type, and traceable to an object attribute in an object requirement set associated with the particular web portal endpoint defining the particular ticket type and the particular ticket sub-type.

The user can enter responses to the set of prompts through a first text box 365—'Summary' and a second text box 366—'Description'. Additionally, the user can indicate a priority level in a Dropdown menu 367.

Figure 3D:
FIG. 3D depicts an example portal interface associated with a web portal endpoint defining a second ticket sub-type of the ticket type of FIG. 3B, according to certain aspects of the present disclosure.

FIG. 3D depicts an example portal interface associated with a web portal endpoint defining a second ticket sub-type of the ticket type 354—'Submit an Access Request' from FIG. 3B. The example web-based portal interface 370 includes a header 372 indicating the title of the web portal 'IT Service Desk', and a sub-header 374 indicating the ticket type 354—'Submit an Access Request' from FIG. 3B. Under the sub-header 374, an instruction box 373 provides a number of prompts "What is your home office location?" and "What is your login I.D.?" Each of these two prompts are unique to this ticket type and ticket sub-type, and traceable to an object attribute in an object requirement set associated with the particular web portal endpoint defining the particular ticket type and the particular ticket sub-type.

The user can enter a type of system and a type of environment through drop-down menus 376, as well as enter responses to the set of prompts through a first text box 375—'Summary' and a second text box 377—'Description'. Additionally, the user can indicate a priority level in a dropdown menu 378.

As demonstrated through FIGS. 3C-3D, the example portal interfaces 360, 370 are each associated with a different ticket sub-type, and thus have different sets of prompts that are unique to the ticket type and the ticket sub-type. Accordingly, the object attributes in the corresponding object requirement set associated with a particular web portal endpoint defining the ticket type and ticket sub-type is also unique, as demonstrated. Such uniqueness of object attributes in the corresponding object requirement set, advantageously, enables accurate categorization of the technical service requests, so that the issues can be routed correctly to the proper IT team handling such issues.

Figure 4:
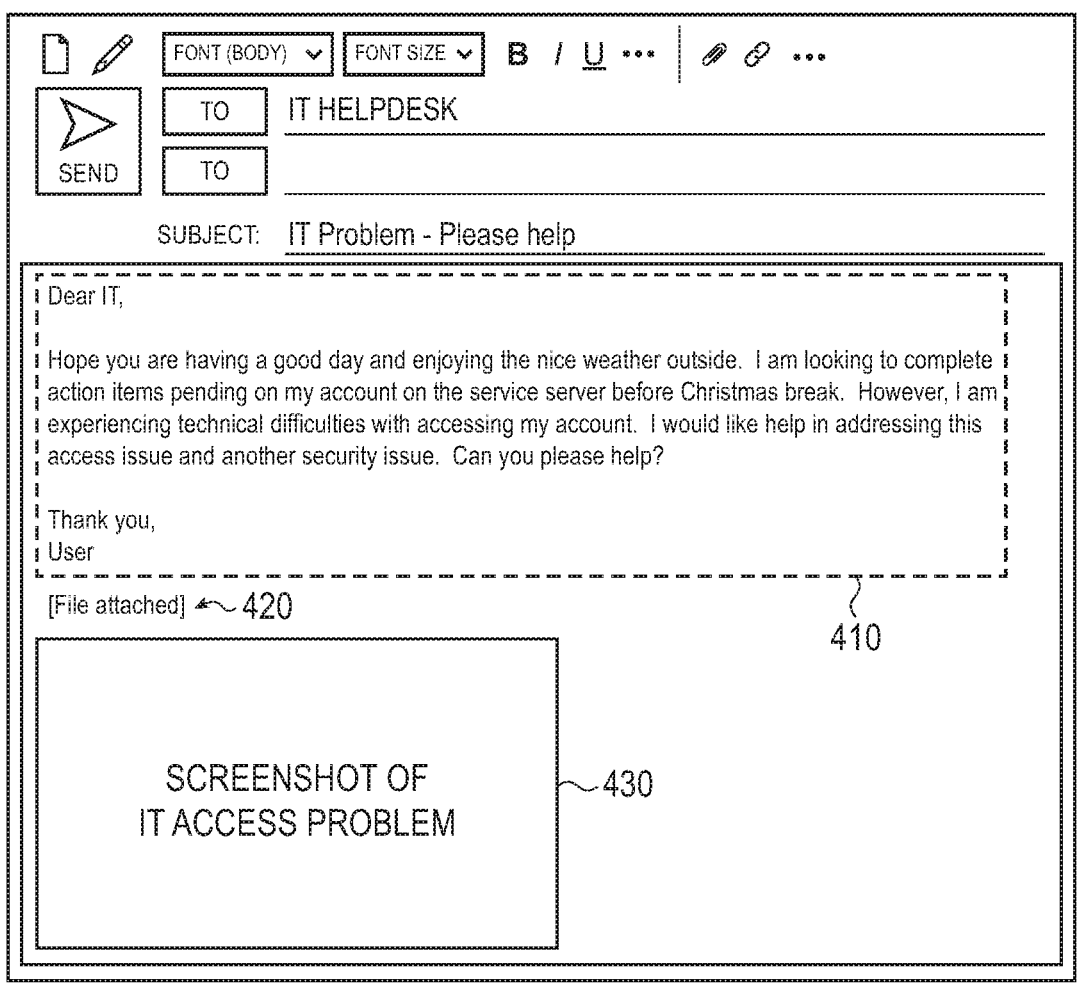
FIG. 4 depicts an example email message with a technical service request that is received at an email portal from a client device shown in FIG. 1, according to certain aspects of the present disclosure.

FIG. 4 depicts an example email message 400 with a technical service request that is received at the email portal 106a from a client device 104 belonging to a user. The email message 400 is sent to an email address for "IT HELPDESK" with a subject line "IT Problem—Please help". The email message 400 includes a text portion 410, an attached file 420, and a screenshot 430 of an IT Access Problem faced by the user/sender. The text portion 410 includes relevant text such as, "I am experiencing technical difficulties with accessing my account" and "I would like help in addressing this access issue and another security issue", as well as irrelevant text such as "Hope you are having a good day and enjoying the nice weather outside".

The email message 400 is received by the inbound request handler service 107. A feature extraction module 210 in the inbound request handler service 107 scans the email message 400 to parse the text portion 410, attached file 420, and the screenshot 430 to extract a number of features from the email message 400. The features may include substantive data such as text, keywords, images, attachments, uniform resource locators indicative of the service issue, as well as metadata associated with the message such as location, date, IP address, account information of the sender, and the like. A number of customized or well-known feature extraction tools may be used for this extraction process. As a non-limiting example, the extraction of relevant keywords may be performed using well-known multilingual natural language processing tools such as, but not limited to, the multilingual USE model.

The extracted features are then used by a feature vector generation module 220 in the inbound request handler service 107 to form a feature vector (alternatively, a feature set). As discussed above, the feature vector based on the email message 400 is analyzed with respect to one or more predetermined categorization vectors (alternatively, predetermined categorization feature sets) to determine a categorization metric, such as a similarity measure, a similarity score or a classification metric (e.g., a confidence level), that satisfies a comparison criteria (e.g., a threshold) with respect thereto; for example, has at least a threshold similarity score or falls within a minimum threshold distance from the predetermined categorization vector. If the categorization metric does not satisfy the comparison criteria, i.e. has a low similarity measure, a low similarity score, or a low confidence level, when the feature vector is analyzed with respect to the particular predetermined categorization vector, the feature vector proceeds to be evaluated by the object requirement assessment module 250 as described above.

FIG. 5 depicts an example sufficiency assessment 500 of the email message 400 performed by the object requirement assessment module 250 for determining whether the contents and/or features extracted from the email message 400 can be associated with a particular web portal endpoint defining a particular ticket type and a particular ticket sub-type. The sufficiency assessment 500 includes object requirement sets, as discussed above, associated with each of the predefined ticket types A, B, and C. Each object requirement set includes object attributes labeled as 'Attribute 1', 'Attribute 2', 'Attribute 3', and the like. Each of the object attributes corresponds with and is traceable to one of a set of prompts on a portal interface (e.g., web-based portal interfaces 350, 360, 370 in FIGS. 3B-3D) that is associated with a particular web portal endpoint defining a particular ticket type and a particular ticket sub-type into which the email message 400 can be categorized. The sufficiency assessment 500 evaluates both the metadata associated with the email message 400 (e.g., timestamp, date, location, IP address) as well as substantive data based on the feature vector generated from the email message 400, in order to determine whether the features of the feature vector provide values to the object attributes in the object requirement set. As noted above, provision of values for each of the object attributes for the object requirement set sufficiently identifies a feature vector as being associated with the particular web portal endpoint defining a particular predefined ticket type and a particular predefined ticket sub-type.

As shown in FIG. 5, the sufficiency assessment 500 runs through 'Attribute 1', 'Attribute 2', 'Attribute 3', and 'Attribute 4' for the object requirement set for ticket Type A to determine that the service issue in the email message 400 cannot be categorized as being associated with Type A. Similarly, the sufficiency assessment 500 runs through 'Attribute 1', 'Attribute 2', 'Attribute 3', 'Attribute 4', and 'Attribute 5' for the object requirement set for ticket Type C to determine that the service issue in the email message 400 cannot be categorized as being associated with Type C. However, based on features extracted from the email message 400, the sufficiency assessment 500 is able to detect that the email message 400 pertains to a ticket Type B based on known values for 'Attribute 1' and 'Attribute 2', but does not have data for 'Attribute 3' listed under the object requirement set for the ticket Type B.

Further, at this point in evaluation, the sufficiency assessment 500 is unable to detect the ticket sub-type. Accordingly, the inbound request handler service 107 sends a system-generated email message back to the sender requesting additional information corresponding to data for Attribute 3 listed under the object requirement set for the ticket Type B. This can expected to provide additional feature(s) to the feature vector for more accurate categorization of the email message 400.

Figure 6:
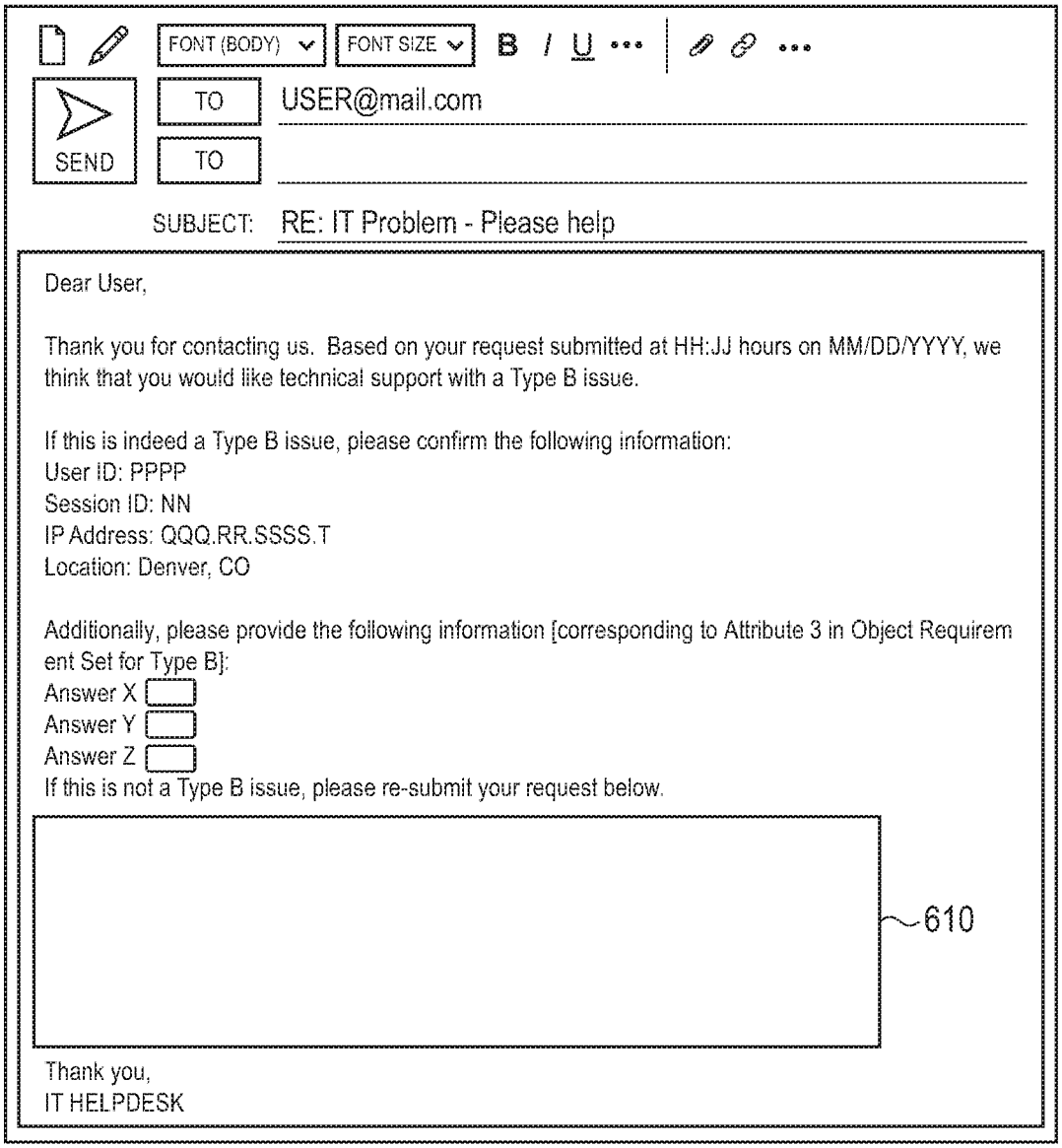
FIG. 6 depicts an example system-generated email message seeking additional information from the sender of the email message of FIG. 4 based on the sufficiency assessment of FIG. 5, according to certain aspects of the present disclosure.

FIG. 6 depicts an example system-generated email message 600 requesting additional information from the sender of the message based on the sufficiency assessment 500. The system-generated email message 600 acknowledges receipt of the email message 400 with a technical service request and indicates that the email message 400 likely, based on a categorization metric (discussed above) and/or comparison against an object requirement set for a ticket type, has an issue associated with the ticket Type B, as determined in the sufficiency assessment 500. The system-generated email message 600 then requests the sender to confirm that user account information, session information, IP address, and location of the issue, if the sender confirms the issue as having the ticket Type B.

The system-generated email message 600 further asks the sender information corresponding to Attribute 3 listed under the object requirement set for the ticket Type B (shown in FIG. 5), by providing three options—Answer X, Answer Y, and Answer Z—each provided with a corresponding button selectable by the sender when responding to the system-generated email message 600. Finally, the system-generated email message 600 includes a text box 610 for re-entering the technical service request, if the sender disagrees that the issue can be categorized as the ticket Type B.

FIG. 7 shows the example sufficiency assessment 700 showing confirmation of the predefined ticket type and the predefined ticket sub-type based on additional data received from the sender in response to the system-generated email message 600. In the example shown in FIG. 7, assuming the sender confirmed the issue as being associated with the ticket Type B, and pressed the selectable button for Answer Y in the response, the sufficiency assessment 700 re-evaluates the feature vector with the additional data to determine whether all the values to the object attributes in the corresponding object requirement set for a ticket Sub-type are provided.

Since the sender confirmed that the issue is associated with the ticket Type B, the sufficiency assessment 700 proceeds to evaluation of object requirement sets for ticket Sub-types X, Y, and Z. As shown in FIG. 7, the sufficiency assessment 700 runs through 'Attribute 1', 'Attribute 2', 'Attribute 3', for the object requirement set for ticket Sub-type X to determine that the service issue in the email message 400 cannot be categorized as being associated with ticket Sub-type X. Similarly, the sufficiency assessment 700 runs through 'Attribute 1' and 'Attribute 2' for the object requirement set for ticket Sub-type Z to determine that the service issue in the email message 400 cannot be categorized as being associated with ticket Sub-type Z. However, based on additional data and/or user input in the system-generated email message 600 corresponding to 'Attribute 3' listed under the object requirement set for the ticket Type B (shown in FIGS. 5-6), the sufficiency assessment 700 is able to determine that the service issue in the email message 400 can be associated with to a ticket Sub-type Y. Thus, the sufficiency assessment 700 performed by the object requirement assessment module 250 discussed above, confirms that the service issue in the email message 400 can be categorized as being associated with the ticket Type B and the ticket Sub-type Y.

Figure 8:
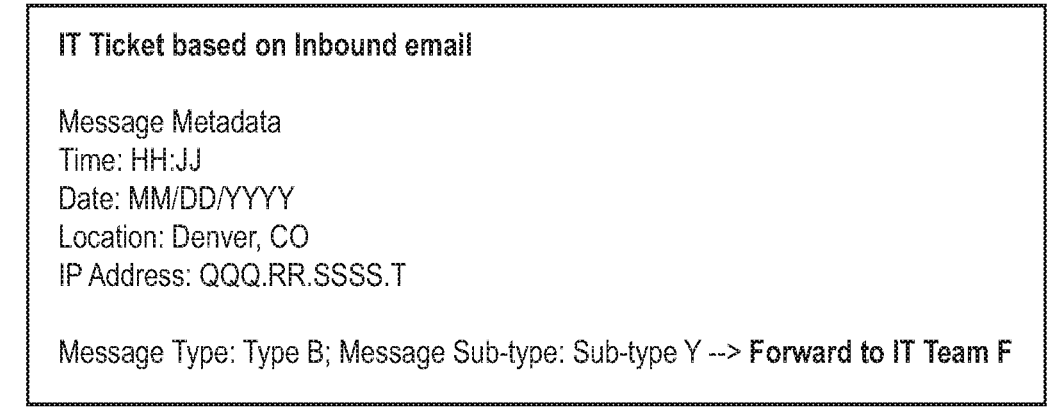
FIG. 8 shows an example issue object request generated by the ITSM of FIG. 1 based on message content analyzed by the inbound request handler service of FIG. 1, according to certain aspects of the present disclosure.

The inbound request handler service 107 forwards the categorization data to the ITSM service 108 for generation of an issue object request (e.g., IT ticket request), as discussed above. FIG. 8 shows an example issue object request 800 generated by the ITSM service 108 based on content of the email message 400 analyzed by the inbound request handler service 107. The issue object request 800 includes categorization of the service issue as being associated with a particular web portal endpoint defining ticket type B and ticket sub-type Y, as well as metadata information such as time, date, location, and the IP address when the service issue was experienced. The issue object request 800 also includes information, based on the predefined ticket type and the predefined ticket sub-type, which IT team should be assigned to resolve the service issue. When processed by the issue tracking system, the resulting issue or ticket may have a particular workflow that is associated with the service desk or team. For example, each service desk or team may process tickets in accordance with a series of issue or ticket states that is specific to that service desk and may require that the ticket be reviewed, resolved, checked, and processed using a number or predefined states before it can be resolved or closed.

Figure 9:
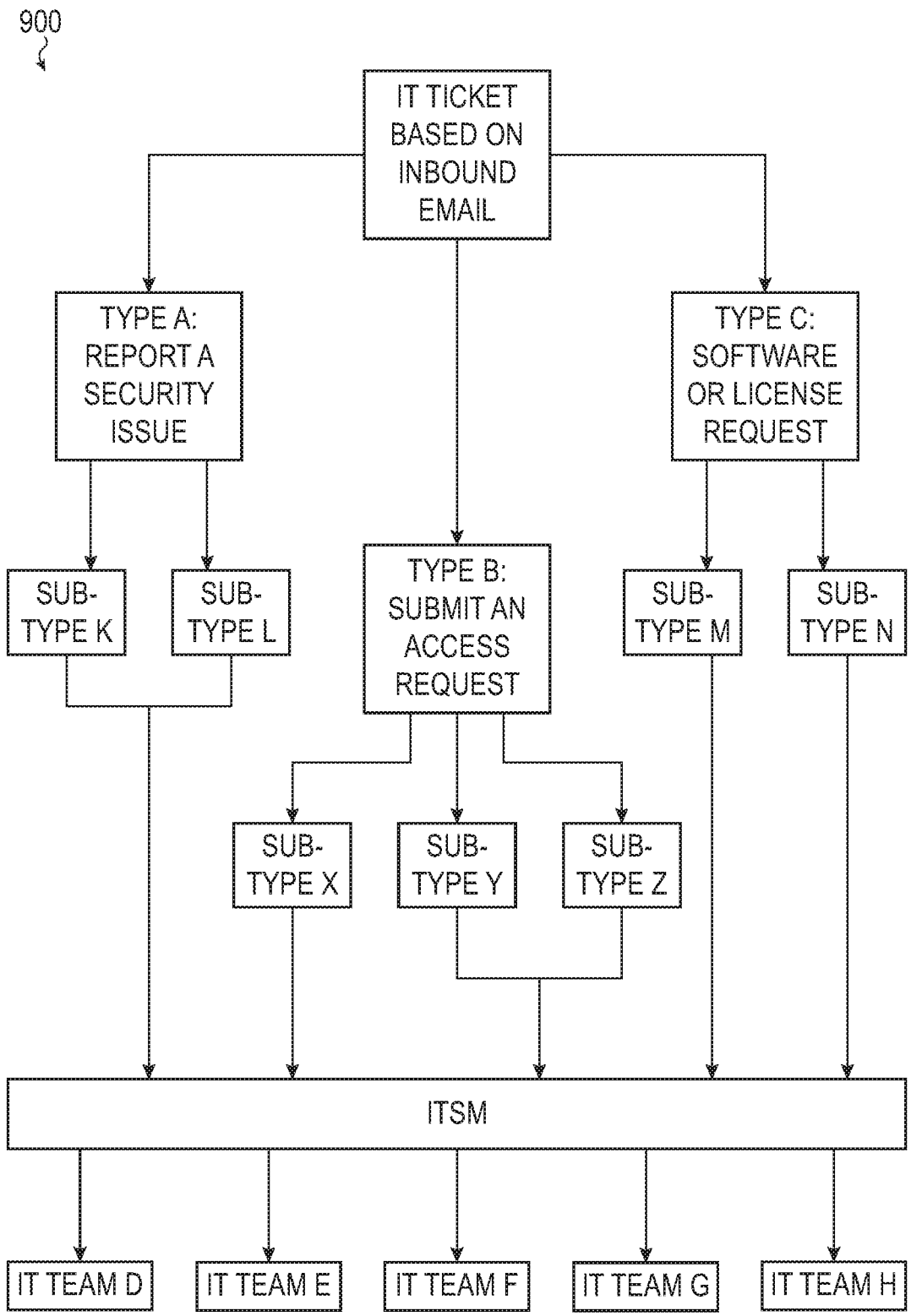
FIG. 9 shows an example flow diagram showing various routings of issue object requests generated by the ITSM of FIG. 1, based on the ticket type and ticket sub-type determined by the inbound request handler service of FIG. 1, according to certain aspects of the present disclosure.

FIG. 9 shows an example flow diagram 900 showing various routings of IT ticket requests (i.e., issue object requests) generated by the ITSM service 108, based on the particular predefined ticket type and the particular predefined ticket sub-type determined by the inbound request handler service 107. In this example, the ITSM service 108 may include an issue tracking service, as described herein. The issue tracking service may be configured to create and track issues or tickets through a series of issue states also referred to as an issue workflow. In accordance with an email categorization scheme, as described herein, the ITSM service 108 may be configured to cause an issue to be created in the issue tracking system having a particular workflow that is unique or customized for a particular service desk or team.

In the example of flow diagram 900, if the inbound technical service request is categorized as being associated with a predefined ticket type A for reporting a security issue, the service issues belonging to both predefined ticket sub-types K and L, upon generation into IT ticket requests at the ITSM service 108, are forwarded to IT Team D. Similarly, if the inbound technical service request is categorized as being associated with a predefined ticket type B for submitting an access request, the service issue belonging to the predefined sub-type X is forwarded to IT Team E, while the service issues belonging to both predefined ticket sub-types Y and Z are forwarded to IT Team F. Further, if the inbound technical service request is categorized as being associated with a predefined ticket type C for requesting software or a license, the service issue belonging to the predefined sub-type M is forwarded to IT Team G, while the service issue belonging to the predefined sub-type N is forwarded to IT Team H.

Figure 10:
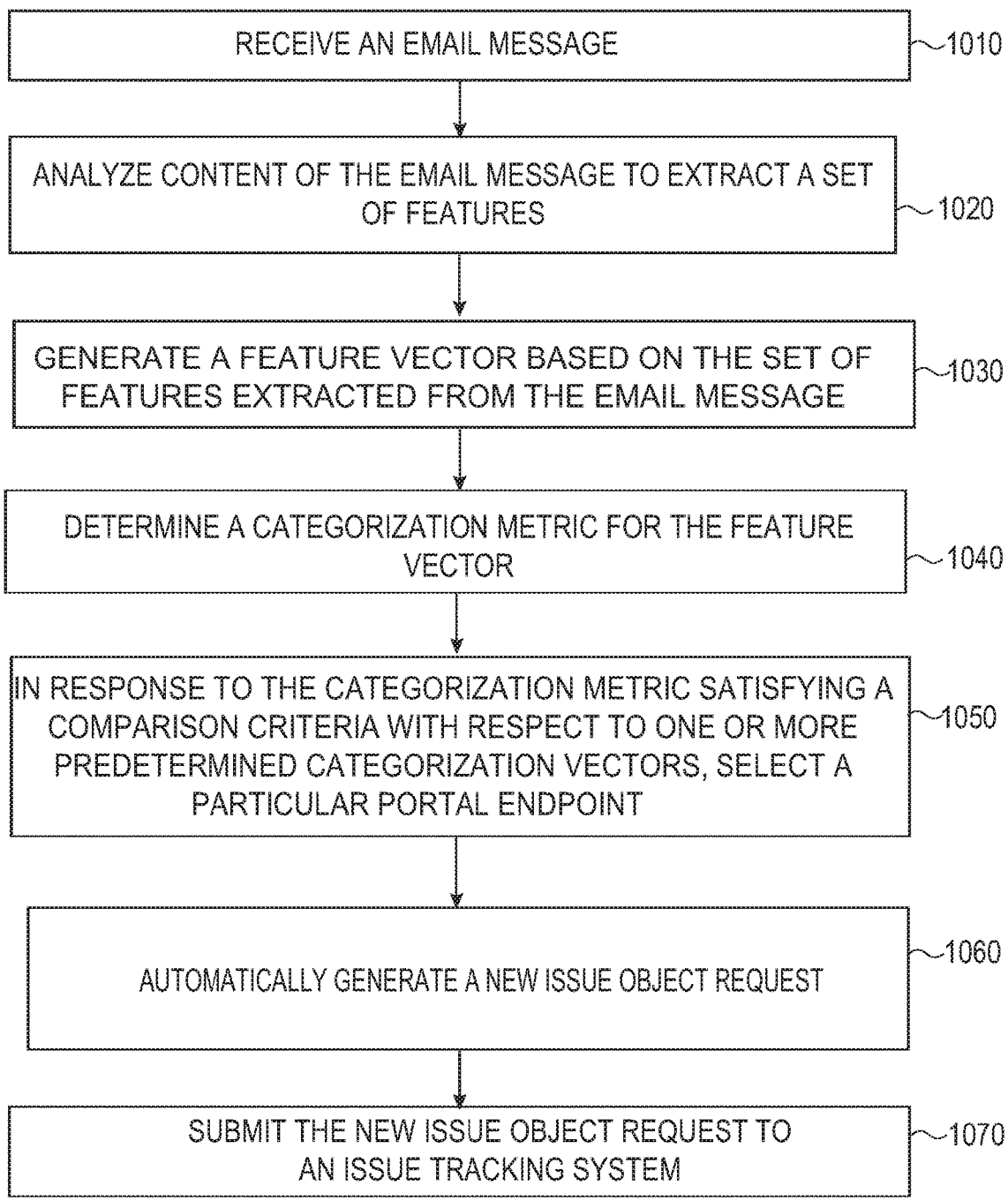
FIG. 10 depicts a method block diagram of a method for handling inbound service requests, according to certain aspects of the present disclosure.

FIG. 10 depicts a block diagram 1000 of an example method for handling inbound technical service requests. The method starts in block 1010, when an email message with a technical service request (e.g., seeking technical support) is received. The email message is sent from a client device via a messaging application such as, but not limited to, an email application, and or a similar messaging application. In some embodiments, an email message with a technical service request may be automatically generated when a user fills out an email form on a portal interface.

In block 1020, the content of the email message is analyzed to extract a set of features. In some embodiments, the extracted features can be substantive data and/or content such as text, keywords, images, attachments, uniform resource locators indicative of the service issue, as well as metadata associated with the message such as location, date, IP address and account information of the sender, and the like. The step of feature extraction is performed by customized or well-known multilingual natural language processing tools such as, but not limited to, the multilingual USE model. In some embodiments, the extracted keywords may be compared to items in one or more data dictionaries.

In block 1030, a feature vector (alternatively, a feature set) based on the set of features extracted from the email message is generated. The feature vector is high-dimensional, and represents the characteristics of the message with the technical service request. In some embodiments, the feature vector is configured for inputting into a feature transform logic which transforms the feature vector into data that becomes recognizable input for a machine learning logic, such as one or more neural networks, In block 1040, a categorization metric for the feature vector is determined using a set of predetermined categorization vectors (alternatively, predetermined categorization feature sets). Each predetermined categorization vector corresponds to a respective web portal endpoint of a set of multiple web portal endpoints of an information technology service management system, where the respective web portal endpoint defines one or more predefined ticket types and one or more predefined ticket sub-types associated with historical issue objects created using the respective web portal endpoint.

In some embodiments, the categorization metric may be a similarity measure (e.g., cosine similarity, Euclidean distance, Manhattan distance, Jaccard similarity, etc.) or a similarity score (e.g., a percentage, points on a scale of 100, etc.) that is generated by comparing the feature vector against each predetermined categorization vector. In other embodiments, the categorization metric may be based on a non-vector similarity comparison techniques such as, but not limited to, Latent Semantic Indexing, Document Centroid Vector, Word Mover's Distance, and the like. In other embodiments, the categorization metric may be a classification metric (e.g. an associated confidence level) generated by a classification model which predicts whether the feature vector is associated with the particular web portal endpoint defining the ticket type and/or the ticket sub-type. The classification model may be trained using the historical issue objects stored in the database.

In block 1050, in response to the categorization metric satisfying a comparison criteria with respect to one or more predetermined categorization vectors, a particular web portal endpoint may be selected. The particular web portal endpoint is one of a set of multiple web portal endpoints, and defines a ticket type and a ticket sub-type that can be associated with the feature vector generated based on the email message. In some embodiments, the comparison criteria can be a threshold of a similarity measure or a similarity score. In some embodiments, the feature vector and/or content extracted from the email message may be additionally subjected to comparison with an object requirement set having a set of object attributes associated with the particular web portal endpoint. Subsequently, if the comparison criteria are not met, a system-generated email message may be automatically sent, through an associated email portal, requesting additional information from the sender of the email message, such that the additional information can help satisfy the comparison criteria, and identify the particular web portal endpoint to be selected.

In some embodiments, when the categorization metric is a classification metric generated by a classification model, the categorization metric may be expressed as a likelihood that the particular web portal endpoint defining a particular ticket type and a particular ticket sub-type is associated with the feature vector, and an assigned confidence level. The confidence level may be determined as high, medium, low, none, or alternatively expressed as a percentage. Accordingly, the classification module may determine how likely the feature vector is to satisfy a comparison criteria (e.g., a threshold) with respect to the predetermined categorization vector corresponding to the particular web portal endpoint for being categorized as such.

In block 1060, content from the email message is extracted, and a new issue object request is automatically generated. The new issue object request (e.g., IT ticket request) corresponds to the particular web portal endpoint defining a particular ticket type and a particular ticket sub-type is associated with the feature vector, such that the issue object can be routed correctly for resolution.

In block 1070, the new issue object request is submitted to an issue tracking system. This enables creation of an issue object, i.e. an IT ticket to be routed and tracked during resolution.

Figure 11:
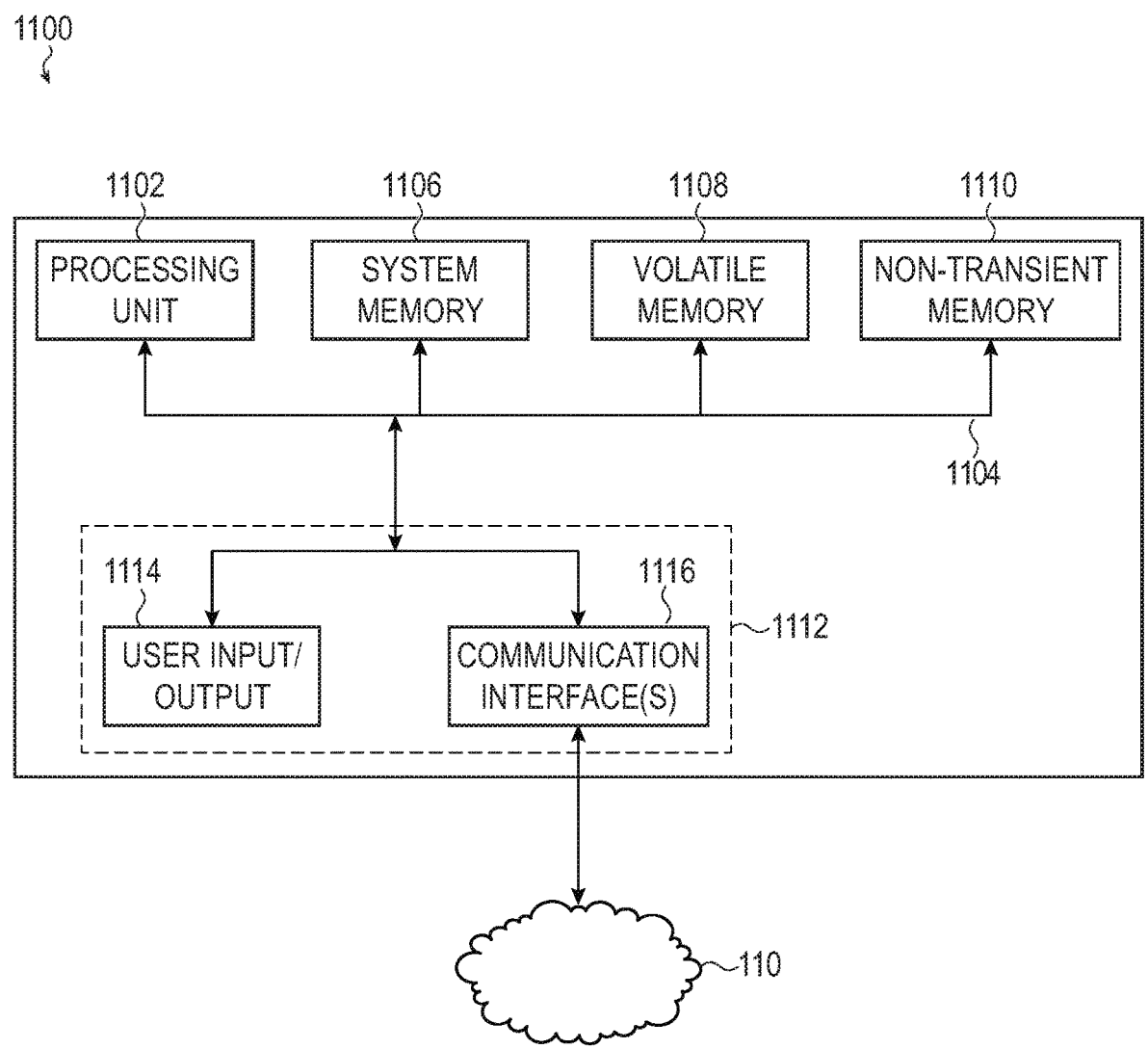
FIG. 11 depicts a block diagram of a computer processing system that may implement the methods for handling inbound service requests described herein, according to certain aspects of the present disclosure.

FIG. 11 depicts a block diagram of a computer processing system 1100 that may implement the methods for handling inbound technical service requests described herein. The computer processing system 1100 is a general-purpose computer processing system. It will be appreciated that FIG. 11 does not illustrate all functional or physical components of a computer processing system. For example, no power supply or power supply interface has been depicted; however, the computer processing system 1100 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

The computer processing system 1100 includes at least one processing unit 1102—for example a general or central processing unit, a graphics processing unit, or an alternative computational device). The computer processing system 1100 may include a plurality of computer processing units. In some instances, where the computer processing system 1100 is described as performing an operation or function all processing required to perform that operation or function will be performed by processing unit 1102. In other instances, processing required to perform that operation or function may also be performed by remote processing devices accessible to and useable by (either in a shared or dedicated manner) the computer processing system 1100.

Through a communications bus 1104, the processing unit 1102 is in data communication with one or more computer readable storage devices, which store instructions and/or data for controlling operation of the computer processing system 1100. In this example, the computer processing system 1100 includes a system memory 1106 (e.g., a BIOS), volatile memory 1108 (e.g., random access memory such as one or more DRAM applications), and non-volatile (or non-transitory) memory 1110 (e.g., one or more hard disks, solid-state drives, or other non-transitory computer readable media). Such memory devices may also be referred to as computer readable storage media (or a computer readable medium).

The computer processing system 1100 also includes one or more interfaces, indicated generally by 1112, via which the computer processing system 1100 interfaces with various devices and/or networks. Generally speaking, other devices may be integral with the computer processing system 1100, or may be separate. Where a device is separate from the computer processing system 1100, connection between the device and the computer processing system 1100 may be via wired or wireless hardware and communication protocols, and may be a direct or an indirect (e.g., networked) connection.

Wired connection with other devices/networks may be by any appropriate standard or proprietary hardware and connectivity protocols, for example Universal Serial Bus (USB), eSATA, Thunderbolt, Ethernet, HDMI, and/or any other wired connection hardware/connectivity protocol.

Wireless connection with other devices/networks may similarly be by any appropriate standard or proprietary hardware and communications protocols, for example infrared, BlueTooth, Wi-Fi; near field communications (NFC); Global System for Mobile Communications (GSM), Enhanced Data GSM Environment (EDGE), long term evolution (LTE), code division multiple access (CDMA—and/or variants thereof), and/or any other wireless hardware/connectivity protocol.

Generally speaking, and depending on the particular system in question, devices to which the computer processing system 1100 connects—whether by wired or wireless means—include one or more input/output devices (indicated generally by input/output device interface 1114). Input devices are used to input data into the computer processing system 1100 for processing by the processing unit 1102. Output devices allow data to be output by the computer processing system 1100. Example input/output devices are described below; however, it will be appreciated that not all computer processing systems will include all mentioned devices, and that additional and alternative devices to those mentioned may well be used.

For example, the computer processing system 1100 may include or connect to one or more input devices by which information/data is input into (received by) the computer processing system 1100. Such input devices may include keyboards, mice, trackpads (and/or other touch/contact sensing devices, including touch screen displays), microphones, accelerometers, proximity sensors, GPS devices, touch sensors, and/or other input devices. The computer processing system 1100 may also include or connect to one or more output devices controlled by the computer processing system 1100 to output information. Such output devices may include devices such as displays (e.g., cathode ray tube displays, liquid crystal displays, light emitting diode displays, plasma displays, touch screen displays), speakers, vibration applications, light emitting diodes/other lights, and other output devices. The computer processing system 1100 may also include or connect to devices which may act as both input and output devices, for example memory devices/computer readable media (e.g., hard drives, solid state drives, disk drives, compact flash cards, SD cards, and other memory/computer readable media devices) which computer processing system 1100 can read data from and/or write data to, and touch screen displays which can both display (output) data and receive touch signals (input).

The computer processing system 1100 also includes one or more communications interfaces 1116 for communication with a network, such as the cloud network 110 described above. Via the communications interface 1116, the computer processing system 1100 can communicate data to and receive data from networked devices, which may themselves be other computer processing systems.

The computer processing system 1100 may be any suitable computer processing system, for example, a server computer system, a desktop computer, a laptop computer, a netbook computer, a tablet computing device, a mobile/smart phone, a personal digital assistant, or an alternative computer processing system.

The computer processing system 1100 stores or has access to computer applications (also referred to as software or programs)—i.e., computer readable instructions and data which, when executed by the processing unit 1102, configure the computer processing system 1100 to receive, process, and output data. Instructions and data can be stored on non-transitory computer readable media accessible to the computer processing system 1100. For example, instructions and data may be stored on non-transitory memory 1110. Instructions and data may be transmitted to/received by the computer processing system 1100 via a data signal in a transmission channel enabled (for example) by a wired or wireless network connection over interface such as 1112.

Applications accessible to the computer processing system 1100 will typically include an operating system application such as Microsoft Windows™, Apple macOS™, Apple iOS™ Android™, Unix™, or Linux™.

The computer processing system 1100 also stores or has access to applications which, when executed by the processing unit 1102, configure the computer processing system 1100 to perform various computer-implemented processing operations described herein.

In some cases, part or all of a given computer-implemented method will be performed by a single computer processing system 1100, while in other cases processing may be performed by multiple computer processing systems in data communication with each other.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

As described above, one aspect of the present technology may be the gathering and use of data available from various sources, including biometric data. The present disclosure contemplates that, in some instances, this gathered data may include personal data that uniquely identifies or can be used to identify, locate, or contact a specific person. Such personal data can include, for example, biometric data and data linked thereto (e.g., demographic data, location-based data, telephone numbers, email addresses, home addresses, data or records relating to a user's health or level of fitness (e.g., vital signs measurements, medication information, exercise information), date of birth, or any other identifying or personal data).

The present disclosure recognizes that the use of such personal data, in the present technology, can be used to the benefit of users. For example, the personal data can be used to authenticate a user to access their device, or gather performance metrics for the user's interaction with an augmented or virtual world. Further, other uses for personal data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal data will comply with well-established privacy policies and/or privacy practices. In particular, such entities should implement and consistently use privacy policies and practices that are generally recognized as meeting or exceeding industry or governmental requirements for maintaining personal data private and secure. Such policies should be easily accessible by users, and should be updated as the collection and/or use of data changes. Personal data from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal data and ensuring that others with access to the personal data adhere to their privacy policies and procedures. Further, such entities can subject themselves to evaluation by third parties to certify their adherence to widely accepted privacy policies and practices. In addition, policies and practices should be adapted for the particular types of personal data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal data. That is, the present disclosure contemplates that hardware and/or software elements can be provided to prevent or block access to such personal data. For example, in the case of advertisement delivery services, the present technology can be configured to allow users to select to "opt in" or "opt out" of participation in the collection of personal data during registration for services or anytime thereafter. In another example, users can select not to provide data to targeted content delivery services. In yet another example, users can select to limit the length of time data is maintained or entirely prohibit the development of a baseline profile for the user. In addition to providing "opt in" and "opt out" options, the present disclosure contemplates providing notifications relating to the access or use of personal data. For instance, a user may be notified upon downloading an app that their personal data will be accessed and then reminded again just before personal data is accessed by the app.

Moreover, it is the intent of the present disclosure that personal data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal data to implement one or more various disclosed embodiments, the present disclosure also contemplates that the various embodiments can also be implemented without the need for accessing such personal data. That is, the various embodiments of the present technology are not rendered inoperable due to the lack of all or a portion of such personal data. For example, content can be selected and delivered to users by inferring preferences based on non-personal data or a bare minimum amount of personal data, such as the content being requested by the device associated with a user, other non-personal data available to the content delivery services, or publicly available information.

Furthermore the foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference an implementation in which discrete functions of the system are implemented as discrete microservices. It is appreciated that this is merely one possible implementation.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A computer-implemented method for handling inbound service requests, the method comprising:
   receiving a first email message at an inbox of an inbound request handler service;
   analyzing a content of the first email message to extract a set of features;
   generating a first feature vector based on the set of features extracted from the first email message;
   determining a categorization metric for the first feature vector using a set of predetermined categorization vectors, wherein each predetermined categorization vector corresponds to a respective web portal endpoint of a set of multiple web portal endpoints of an information technology service management system, the respective web portal endpoint defining one or more predefined ticket types and one or more predefined ticket sub-types associated with historical issue objects created using the respective web portal endpoint;
   determining, based at least in part on the categorization metric for the first feature vector failing to satisfy a comparison criteria, that the content extracted from the email message is insufficient to provide values for each object attribute of a set of object attributes identifying a respective web portal endpoint of the set of web portal endpoints;
   in response to the content extracted from the first email message being determined to be insufficient, automatically generating a system-generated email comprising a request for additional content regarding at least one object attribute of the set of object attributes;
   causing the system-generated email to be sent to a sender of the first email message;
   in response to receiving a second email message responsive to the system-generated email, analyzing a content of the second email message to generate a second feature vector;
   determining a categorization metric for the second feature vector using the set of predetermined categorization vectors;
   in response to the categorization metric for the second feature vector satisfying the comparison criteria with respect to one or more predetermined categorization vectors, selecting a particular web portal endpoint of the set of multiple web portal endpoints, wherein each of the web portal endpoints of the set of multiple web portal endpoints defines a distinct portal interface having a unique set of prompts;
   extracting the content from the first email message, extracting the content from the second email message, and automatically generating a new issue object request in accordance with a particular object requirement set associated with the particular web portal endpoint, the particular object requirement set defining a set of object attributes that corresponds to the set of prompts; and
   submitting the new issue object request to an issue tracking system thereby causing a new issue object to be created within the issue tracking system.

2. The computer-implemented method of claim 1, wherein:
   each of the web portal endpoints of the set of multiple web portal endpoints is accessible via a web-based user interface on a client device.

3. The computer-implemented method of claim 1, wherein the set of features comprise data regarding one or more of: text extracted from a body of the email message, uniform resource locator in the body of the email, an IP address of a sender of the email message, a timestamp of the email.

4. The computer-implemented method of claim 1, wherein:
   the categorization metric is a similarity score; and
   a respective similarity score is generated by comparing the feature vector against a respective predetermined categorization vector.

5. The computer-implemented method of claim 1, wherein:
   the categorization metric is generated using a classification model trained using the historical issue objects created using the respective web portal endpoint.

6. The computer-implemented method of claim 1, further comprising:
   subsequent to submitting the new issue object request to the issue tracking system:
   identifying a knowledge base resource using the one or more predefined ticket types and one or more predefined ticket sub-types identified using the feature vector;
   transmitting the knowledge base resource to a sender of the email.

7. A system for handling inbound technical service requests, the system comprising:
an inbound request handler service communicably coupled to an issue tracking system over a network, the inbound request handler service comprising one or more processors and non-transitory computer-readable storage media having instructions stored therein, which when executed by the one or more processors, cause the one or more processors to:
receive a first email message from a client device, the first email message comprising a technical service request;
analyze a content of the first email message to define a first feature set;
determine a categorization metric for the first feature set using a set of predetermined categorization feature sets, wherein each predetermined categorization feature set corresponds to a respective web portal endpoint of a set of multiple web portal endpoints of an information technology service management system that define one or more predefined ticket types associated with historical issue objects created using the respective web portal endpoint;
determine, based at least in part on the categorization metric for the first feature set failing to satisfy a comparison criteria, that the content extracted from the first email message is insufficient to provide values for each object attribute of a set of object attributes identifying a respective web portal endpoint of the set of web portal endpoints;
in response to the content extracted from the first email message being determined to be insufficient, automatically generate a system-generated email comprising a request for additional content regarding at least one object attribute of the set of object attributes;
cause the system-generated email to be sent to a sender of the first email message;
in response to receiving a second email message responsive to the system-generated email, analyze a content of the second email message to generate a second feature set;
determine a categorization metric for the second feature set using the set of predetermined categorization feature sets;
in response to the categorization metric for the second feature set satisfying the comparison criteria with respect to one or more predetermined categorization feature sets, selecting a particular web portal endpoint of the set of multiple web portal endpoints, wherein each of the web portal endpoints of the set of multiple web portal endpoints defines a distinct portal interface having a unique set of prompts;
extract the content from the first email message, extract the content from the second email message, and generate a new issue object request in accordance with a particular object requirement set associated with the particular web portal endpoint, the particular object requirement set defining a set of object attributes that corresponds to the set of prompts; and
submit the new issue object request to the issue tracking system thereby causing a new issue object to be created within the issue tracking system.

8. The system of claim 7, wherein:
each of the web portal endpoints of the set of multiple web portal endpoints is accessible via a web-based user interface on a client device.

9. The system of claim 7, wherein the set of features comprise data regarding one or more of: text extracted from a body of the first email message, uniform resource locator in the body of the email message, an IP address of a sender of the first email message, a timestamp of the first email message.

10. The system of claim 7, wherein:
the categorization metric is a similarity score; and
a respective similarity score is generated by comparing the feature vector against a respective predetermined categorization vector.

11. The system of claim 7, wherein the categorization metric is generated using a classification model trained using the historical issue objects created using the respective web portal endpoint.

12. The system of claim 7, wherein the one or more processors are further configured, subsequent to submitting the new issue object request to the issue tracking system, to:
identify a knowledge base resource using the one or more predefined ticket types and one or more predefined ticket sub-types identified using the feature vector;
transmit the knowledge base resource to a sender of the email.

13. A computer-implemented method for handling inbound service requests, the method comprising:
receiving a first email message from a client device, the first email message comprising a service request;
analyzing a body of the first email message to extract a first set of features;
generating a first feature vector comprising one or more of the extracted features of the first email message;
analyzing the first feature vector with respect to a set of predetermined categorization vectors to identify a respective portal endpoint of a set of multiple portal endpoints of an information technology service management system;
in response to the first feature vector failing, according to a comparison criteria, to identify the respective portal endpoint, automatically generating a system-generated email comprising a request for information regarding data related to the one or more predetermined categorization vectors;
in response to receiving a second email message responsive to the system-generated email:
analyzing a body of the second email message to extract a second set of features;
generating a second feature vector using the first set of features and the second set of features; and
analyzing the second feature vector with respect to the set of predetermined categorization vectors to identify the respective portal endpoint of the set of multiple portal endpoints, wherein each of the portal endpoints of the set of multiple portal endpoints defines a distinct portal interface having a unique set of prompts;
extracting content from the first email message and automatically generating a new issue object request in accordance with a particular object requirement set associated with the particular portal endpoint, the particular object requirement set defining a set of object attributes that corresponds to the set of prompts; and
submitting the new issue object request to an issue tracking system thereby causing a new issue object to be created within the issue tracking system.

14. The computer-implemented method of claim 13, wherein:

each of the portal endpoints of the set of multiple portal endpoints is accessible via a web-based user interface on a client device.

15. The computer-implemented method of claim 13, wherein:
   the categorization metric is a similarity score; and
   a respective similarity score is generated by comparing the feature vector against a respective predetermined categorization vector.

16. The computer-implemented method of claim 13, wherein:
   the categorization metric is generated using a classification model trained using the historical issue objects created using the respective portal endpoint.

\* \* \* \* \*